US006307976B1

(12) United States Patent
Chun et al.

(10) Patent No.: US 6,307,976 B1
(45) Date of Patent: Oct. 23, 2001

(54) APPARATUS AND METHOD OF ADAPTIVELY CODING/DECODING INTERLACED SHAPED MATERIAL

(75) Inventors: Sung-Moon Chun, Kyoungki-do; Dong-Kyoo Shin; Joo-Hee Moon, both of Seoul, all of (KR)

(73) Assignee: Hyundai Electronics Ind. Co., Ltd., Kyoungki-do (KR)

(*) Notice: Subject to any disclaimer, the term of this patent is extended or adjusted under 35 U.S.C. 154(b) by 0 days.

(21) Appl. No.: 09/162,604

(22) Filed: Sep. 29, 1998

(30) Foreign Application Priority Data

Sep. 29, 1997 (KR) .................................. 97-49790
Jan. 10, 1998 (KR) .................................. 98-00491

(51) Int. Cl.[7] ................................. G06K 9/36
(52) U.S. Cl. ................................. 382/243
(58) Field of Search .................... 382/232, 236, 382/238, 243, 248, 249, 250; 341/200; 348/390, 400–403, 407, 409–413, 415, 416, 699; 360/49; 371/37.4, 37.7, 40.1; 375/240, 245

(56) References Cited

U.S. PATENT DOCUMENTS

| 5,091,782 | 2/1992 | Krause et al. . |
| 5,237,574 | * 8/1993 | Weng ................... 371/40.1 |
| 5,539,466 | 7/1996 | Igarashi et al. . |
| 5,973,743 | * 10/1999 | Han ..................... 348/416 |
| 5,974,184 | * 10/1999 | Eifrig et al. ........... 382/236 |
| 5,991,447 | * 11/1999 | Eifrig et al. ........... 382/236 |
| 6,049,567 | * 4/2000 | Han ..................... 375/240 |

OTHER PUBLICATIONS

MPEG4 Video Verification Model, VM 10.0, pp. 52–53, 3.4.1 "Low Pass Extrapolation (LPE) Padding Technique" 3.4.2 "Adaptive Frame/Field DCT"and 3.4.3 "DCT".
Article: Interlaced Binary Shape Coding (S12), Sung–Moon Chun, et al.

* cited by examiner

Primary Examiner—Jose . L. Couso
(74) Attorney, Agent, or Firm—Lackenbach Siegel

(57) ABSTRACT

An apparatus and method of adaptively coding/decoding interlace shape information estimates the amount of motion with respect to the binary alpha block (BAB). A type of the BAB is determined according to the estimated amount of motion. When the BAB falls under a type which needs coding differences between pixel pairs in each line pair comprising an odd and an adjacent even line are calculated and summed up to compute an error of the frame. Differences between pixel pairs in consecutive odd line pairs and differences between pixel pairs in consecutive even line pairs are calculated and summed up to compute an error of individual fields. When the error of the frame is larger than that of the separate fields, field type coding where coding is independently performed with respect to each field is selected. When the error of the separate fields is larger than that of the frame, frame type coding where coding is performed with respect to the frame is selected.

11 Claims, 19 Drawing Sheets

FIG. 2 (PRIOR ART)
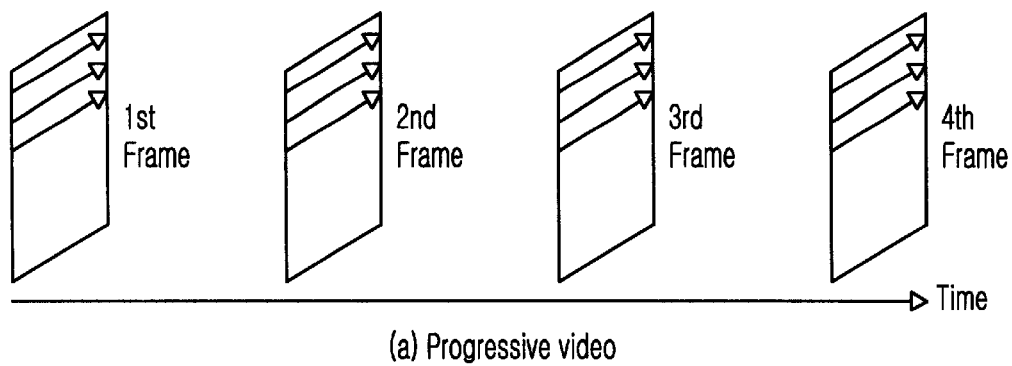
(a) Progressive video
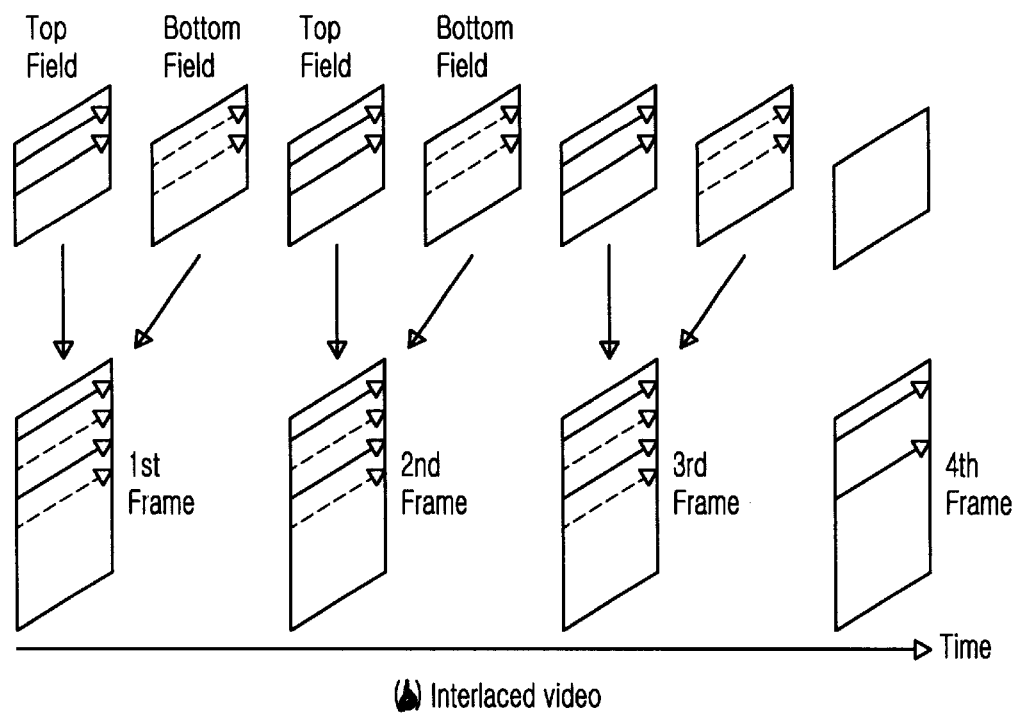
(b) Interlaced video

FIG. 6A

| P(0,0)P(0,1)P(0,2)P(0,3)<br>P(1,0)P(1,1)P(1,2)P(1,3)<br>P(2,0)P(2,1)<br>P(3,0) | | | |
|---|---|---|---|
| | | | |
| | | | |
| ⋮<br>P(14,0) ……<br>P(15,0) …… | | | P(12,15)<br>P(14,15) |

FIG. 6B

| P(0,0)P(0,1)P(0,2)P(0,3)<br>P(2,0)P(2,1)P(2,2)P(2,3)<br>P(4,0)P(4,1)P(4,2)P(4,3)<br>P(6,0)P(6,1)P(6,2)P(6,3) | | | |
|---|---|---|---|
| P(8,0) ……<br>P(10,0) ……<br>P(12,0) ……<br>P(14,0) …… | | | P(12,15)<br>P(14,15) |
| P(1,0)P(1,1)P(1,2)P(1,3)<br>P(3,0)P(3,1)P(3,2)P(3,3)<br>P(5,0)P(5,1)P(5,2)P(5,3)<br>P(7,0)P(7,1)P(7,2)P(7,3) | | | |
| P(9,0) ……<br>P(11,0) ……<br>P(13,0) ……<br>P(15,0) …… | | | P(13,15)<br>P(15,15) |

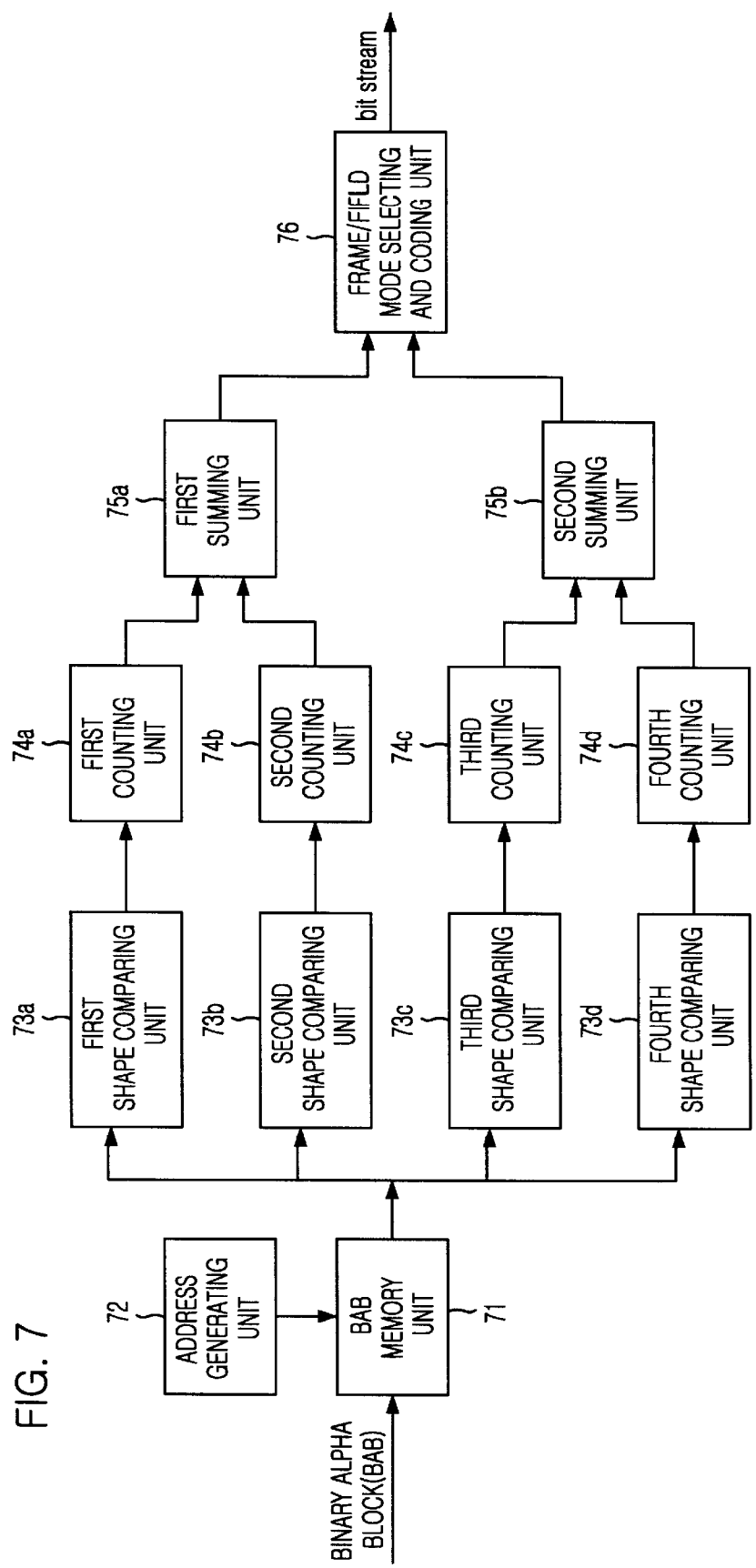

| | C9 | C8 | C7 | |
|---|---|---|---|---|
| C6 | C5 | C4 | C3 | C2 |
| C1 | C0 | ? | | |

~101

APPARATUS AND METHOD OF ADAPTIVELY CODING/DECODING INTERLACED SHAPED MATERIAL

BACKGROUND OF THE INVENTION

1. Field of the Invention

The present invention relates to coding/decoding of an interlaced video, and more particularly to an apparatus and method of adaptively coding/decoding interlaced shape information, for coding and decoding shape information in units of frame type or field type based upon characteristics of the shape information when coding interlaced video, thereby having a high compression ratio.

2. Description of Related Art

For the future video/audio technology and system, development is in progress to make it realize to support novel video/audio applications which existing known standards (e.g., H.263 and H.261 by ITU-T and MPEG1 and MPEG-2 by ISO/IEC) cannot support. An object-based interactive functionality and an object-based manipulation are representative examples of new functionality. To offer novel and various functionality, transmission of shape information is required. The shape information is for dividing a picture into an object region and a non-object region (background). This shape information allows for transmitter and receiver to perform signal processing focusing on the object region instead of the whole picture and offers the novel functionalities. Binary shape information has a form of a binary mask where pixels have different values according to whether the pixel is for the object or non-object. For example, the values of pixels for the object and non-object (background) are 0 and 1, respectively. It should be noted that these values are not limited to a specific value. A video coding method using such shape information is called object-based video coding.

The shape information has a great amount of data, so it is deemed to be important how to effectively compress the shape information. This aims at improvement of efficiency in compression coding of the shape information.

FIG. 1 is a block diagram of a general object-based video coder.

Signals of a picture consists of shape information and texture information and two types of information are respectively inputted to a shape coding unit 11 and motion estimation unit 12

The shape coding unit 11 performs loss coding or lossless coding with respect to the shape information in each picture. Reconstructed shape information is inputted to both motion compensation unit 13 and texture coding unit 17. Both motion compensation unit 13 and texture coding unit 17 operate based upon an object. A shape bitstream, which is the other output of the shape coding unit 11, is inputted to a multiplexer 18.

The motion estimation unit 12 estimates motion information of current picture's texture information using input texture information of the current picture and texture information of a previous picture which is stored in a previous reconstructed frame memory 14. Estimated motion information is inputted to the motion compensation unit 13 while a motion information is encoded and its bitstream is inputted to the multiplexer 18. The motion compensation unit 13 performs motion compensated prediction using the motion information obtained through the motion estimation unit 12 and the previous reconstructed picture in the previous reconstructed frame memory 14.

The texture coding unit 17 encodes a prediction error which is a difference between an input texture information and motion compensated texture information, and is obtained at a subtracter 15. A texture bitstream which is produced through the coding is inputted to the multiplexer 18 and an error signal of reconstructed texture information is inputted to an adder 16. The previous reconstructed frame memory 14 stores a previous reconstructed picture signal produced by the adder 16 which adds the error signal to a motion compensated prediction signal Digital video may be classified into progressive video and interlaced video according to frame constructing methods. For the progressive video, a frame is constructed in such a manner that lines subsequently progresses from the top to the bottom. For the interlaced video, a frame is constructed in such a manner that two fields are separately constructed and then lines of two fields are interlaced for constructing a frame. A height (the number of lines) of a field is a half of the height of a frame. This is illustrated in FIG. 2. FIG. 2a shows a frame in the progressive video and FIG. 2b shows two fields—a top field and a bottom field—and a frame in the interlaced video. In FIG. 2, the lines of the top and bottom fields are denoted as solid arrows and dashed arrows, respectively, and the lines of each field are interlaced (the solid arrows are interlaced with the dashed arrows) to construct an interlaced frame.

When the top and bottom fields are constructed, as shown in FIG. 2b, there is a time lag between the two fields and the top field precedes the bottom field. In other cases, the bottom field may precede the top field. Because of the time lag between the top field and the bottom field, signal characteristics of two adjacent lines in the interlaced frame can be different. Particularly in case of a picture having a lot of motion, this feature is prominent. When applying video coding tools developed in accordance with properties of the progressive video, such as motion estimation, motion compensation, and discrete cosine transform (DCT), coding efficiency may be reduced in the case of interlaced video coding. Technology such as field-based motion estimation and compensation and adaptive frame/field DCF has been developed to prevent this problem. Such technology is disclosed in the standard MPEG-2 and has been frequently applied to actual application products such as digital TV. However, the technologies for coding/decoding the interlaced shape information has not been presented as yet because the adoption of the shape information was investigated most recently. Therefore, this technology has a very important role in the (future) multimedia applications including interlaced video coding.

FIGS. 3a and 3b show interlaced shape information where an object has no motion or a little motion between two fields. As shown in FIG. 3a, correlation between lines in a frame is higher compared with that in each field, so it is better to code the shape information in the unit of frames in this case.

FIGS. 4a and 4b show interlaced shape information where an object has much motion between two fields. As shown in FIG. 4b where the lines are grouped into each field, variation between neighboring lines in each field is little and correlation between lines is high in the same field. However, as shown in FIG. 4a, considering in units of a frame type, the variation between neighboring lines is larger and the correlation between lines is lower. Therefore, coding efficiency is reduced when coding the shape information in the unit of frames. To overcome this problem, the present invention provides a method of coding the shape information having a lot of motion in units of a field type.

Furthermore, it is best to adaptively select one of a field type coding and frame type coding rather than to use only one type coding with respect to the interlace shape information.

SUMMARY OF THE INVENTION

Accordingly, the present invention is directed to apparatus and method for adaptively coding/decoding interlaced shape information that substantially obviates one or more of the limitations and disadvantages of the related art.

An objective of the present invention is to provide apparatus and method of adaptively coding/decoding interlaced shape information, for detecting correlation between lines in a frame and correlation between lines in a field and coding the shape information in units of a frame type or a field type according to the correlation when coding an interlaced video.

The present invention offers a method of adaptively selecting either a frame coding mode or a field coding mode. During a process of coding shape information, motion estimation and motion compensation for the shape information is performed in accordance with characteristics of the shape information. Errors between pixels in each field and between pixels in a frame are calculated and coding is performed in favor of the less error. When the error in the frame is larger than the error in two separate fields, the shape information is coded from the field. When the error in each field is larger than the error in the frame, the shape information is coded from the frame. To improve efficiency in interlace shape information coding, motion estimation and compensation for the shape information is adaptively subjected to a frame or field coding process.

To achieve these objectives and advantages, the present invention determines whether to code shape information of a binary alpha block (BAB) from a frame or from a field based upon the amount of motion. The amount of motion is estimated with respect to the BAB. A type of the BAB is determined according to the estimated amount of motion. When the BAB falls under a type which does not need coding data for indicating the type is coded and transmitted. When the BAB falls under a type which needs coding, it is determined whether to code the BAB from a frame or from a field according to the estimated amount of motion. Differences between pixel pairs in line pairs each comprising an odd and an adjacent even line are calculated and summed up to compute an error of the frame. Differences between pixel pairs in consecutive odd line pairs and differences between pixel pairs in consecutive even line pairs are calculated and summed up to compute an error of individual fields. The two calculated errors of the frame and the separate fields are compared to determine whether to code the shape information from the frame or from the separate fields. When coding the information from the frame, the frame is divided into macroblocks and the coding is performed with respect to each macroblock for transmission. When coding the information from the separate fields, the odd and even fields, each is divided into macroblocks and the coding is performed with respect to each macroblock for transmission.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2a and 2b are diagrams for showing progressive scanning and interlaced scanning;

FIGS. 6a and 6b show a notation of pixels of shape information forming a block of 16×16;

FIG. 7 is a block diagram of a coding mode determining unit according to one embodiment of the present invention;

DETAILED DESCRIPTION OF PREFERRED EMBODIMENT

Reference will now be made in detail to the preferred embodiments of the present invention, examples of which are illustrated in the accompanying drawings.

With reference to the accompanying drawings, the present invention will now be described in detail. Generally, when coding shape information of a whole picture, a whole picture is divided into macroblocks of a predetermined size and the shape information is coded by each macroblock. A coding unit of the shape information is named a binary alpha block (BAB) hereinafter. The size of the BAB is not limited in this invention but, generally, corresponds to 16 pixels×16 lines.

Figure 1:
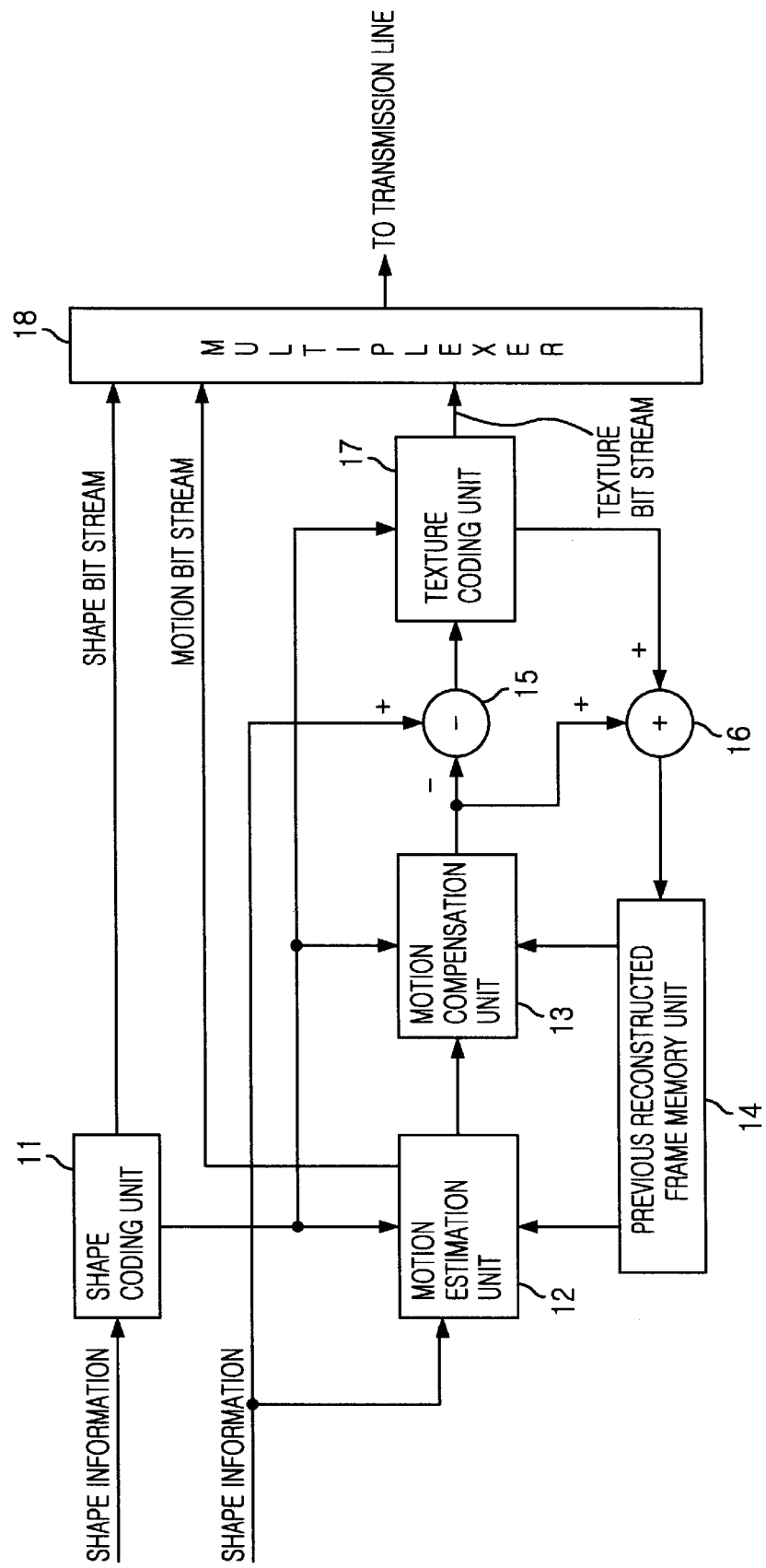
FIG. 1 is a block diagram of a general object-based video coder.
Figure 3:
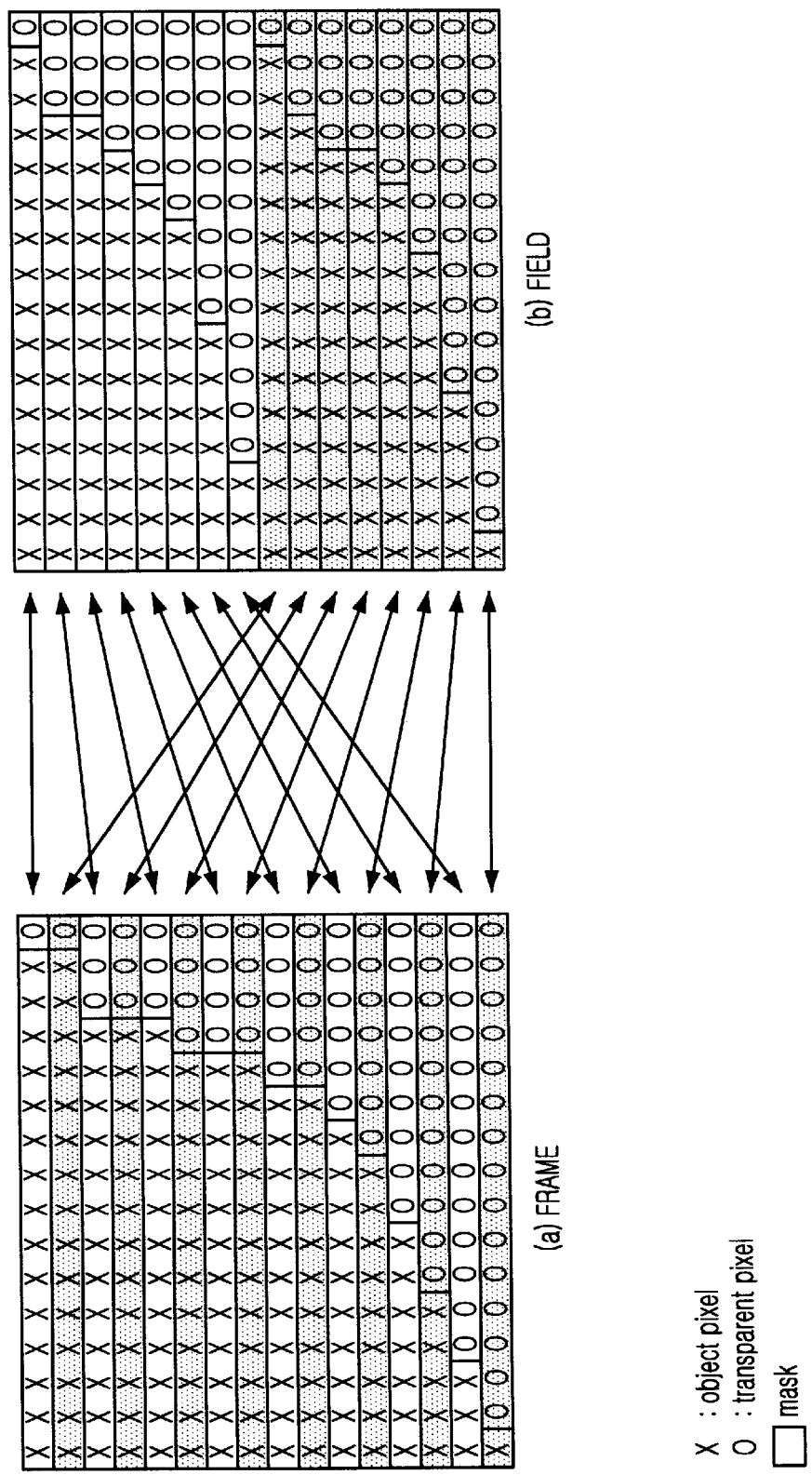
FIGS. 3a and 3b show a 16×16 shape information without motion or with little motion and its fields.
Figure 4:
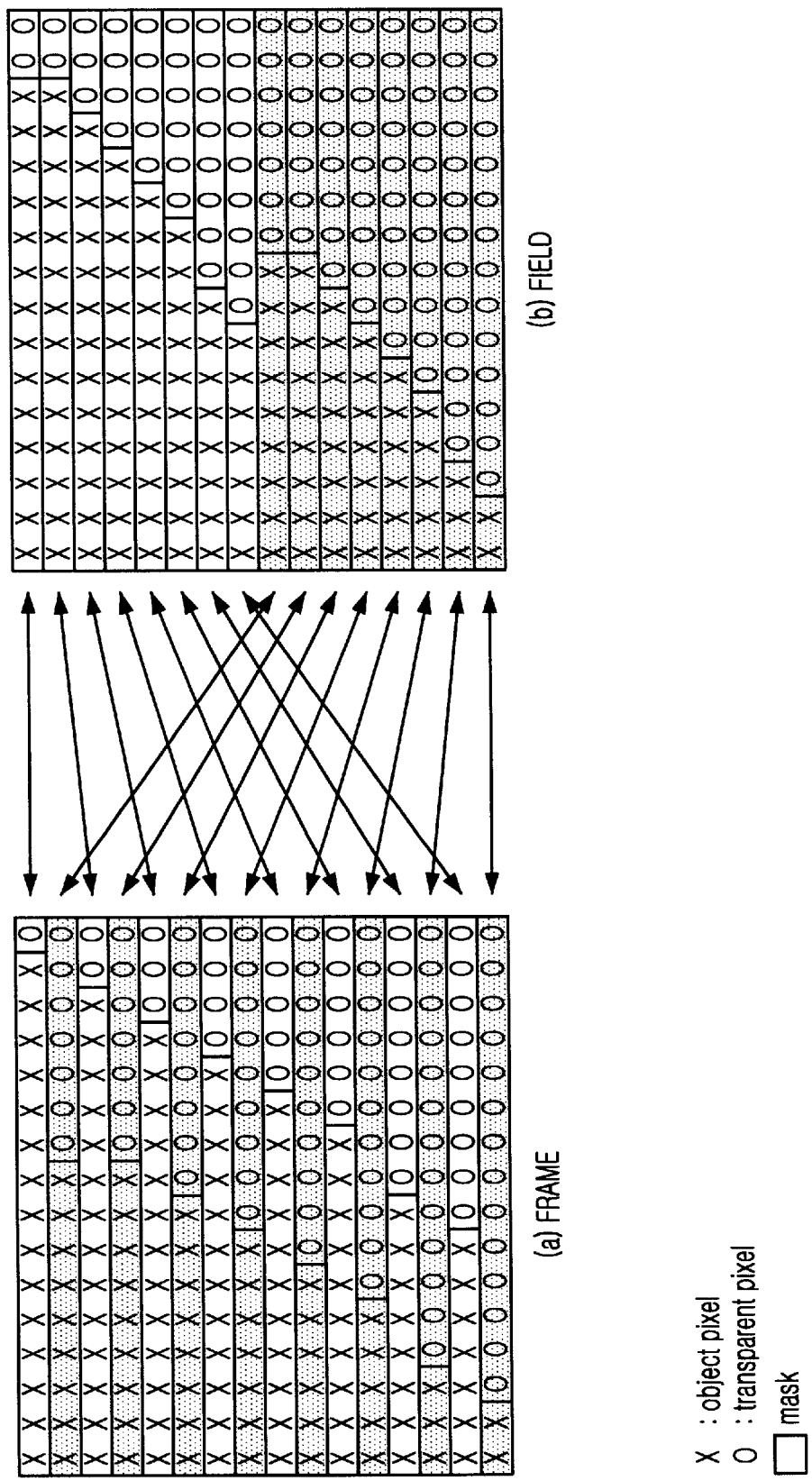
FIGS. 4a and 4b show a 16×16 shape information with much motion and its fields.
Figure 5:
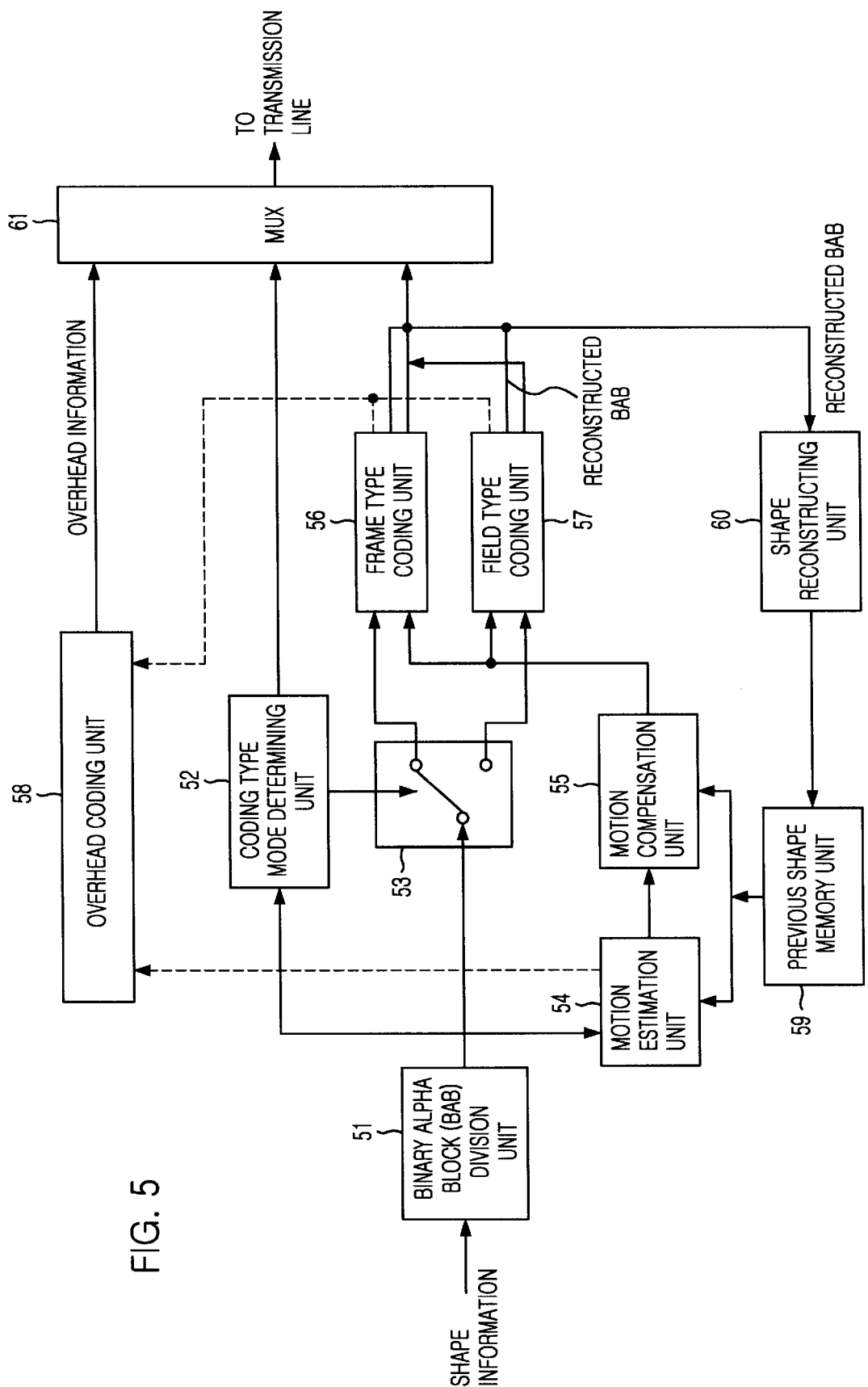
FIG. 5 is a block diagram of an interlaced coding apparatus according to one embodiment of the present invention.

FIG. 5 is a block diagram of interlaced coding apparatus according to one embodiment of the present invention. A BAB division unit 51 divides input binary shape information into BAB units of a predetermined size (e.g., 16×16). A coding type mode determining unit 52 checks correlation with respect to the input BAB and determines whether to code in units of a frame type or a field type. A switching unit 53 switches the BAB received from the BAB division unit 51 according to a coding type mode signal SCM produced by the coding type mode determining unit 52. When the coding type mode signal SCM is a frame mode, the switching unit 53 switches the input BAB to a frame type coding unit 56. Alternatively, when the coding type mode signal SCM is a field mode, the switching unit 53 switches the input BAB to a field type coding unit 57. The SCM signal is encoded and its bitstream is sent to a multiplexer for transmitting to a decoder. A motion estimation unit 54 estimates motion information with respect to the input BAB from the BAB division unit 51 and a previous shape information frame. A motion compensation unit 55 compensates the current BAB using the motion information inputted from the motion estimation unit 54 and the previous shape information frame. The frame type coding unit 56 receives the BAB inputted from the BAB division unit 51 and a motion compensated BAB inputted from the motion compensation unit 55 and encodes the shape information in units of a frame type, and reconstructs it and outputs its reconstructed BAB. The field type coding unit 57 receives the BAB inputted from the BAB division unit 51 and a motion compensated BAB inputted from the motion compensation unit 55 and encodes the shape information in units of a field type, and reconstructs it and outputs its reconstructed BAB. A shape reconstructing unit 60 reconstructs the shape information frame from the reconstructed BAB received from the frame type coding unit 56 and the field type coding unit 57. A previous shape memory unit 59 receives a reconstructed shape information from the shape reconstructing unit 60 and stores it. This reconstructed shape information is used as a previous shape information at encoding the next shape information. An overhead coding unit 58 encodes overhead information such as motion information received from the motion estimation unit 54 and the information (e.g., conversion ratio, scan type, BAB_type, and so on) necessary for reconstructing shape information at a decoder which is received from the frame type coding unit 56 and field type coding unit 57. A multiplexer 61 multiplexes the coded data received from the frame type coding unit 56 and field type coding unit 57, the coded overhead information received from the overhead coding unit 59 and the coded SCM signal.

Once binary shape information is inputted into this apparatus, the binary shape information is divided into blocks of a predetermined size (e.g., 16×16 or 8×8) at the BAB division unit 51 and sent to both the coding type mode determining unit 52 and the motion estimation unit 54. The coding type mode determining unit 52 calculates correlation of the shape information with respect to a top and a bottom fields forming a BAB. The following expression is used as a reference in deciding the correlation of the shape information contained in both fields.

$$\sum_{i=0}^{6}\sum_{j=0}^{15}(|P_{(2i,j)} - P_{(2i+1,j)}| + |P_{(2i+1,j)} - P_{(2i+2,j)}|) \quad (1)$$

$$\sum_{i=0}^{6}\sum_{j=0}^{15}(|P_{(2i,j)} - P_{(2i+2,j)}| + |P_{(2i+2,j)} - P_{(2i+3,j)}|$$

wherein "i" is a vertical location in the BAB; j, a horizontal location in the BAB; and $P_{(i,j)}$, a pixel value at the location, (i,j), in the BAB. When $P_{(i,j)}=0$, a pixel at the corresponding location is supposed to be one of pixels representing a background, and, when $P_{(i,j)}=1$, a pixel at the corresponding location is supposed to be one of pixels representing an object. This formula is applied to the BAB having the 16×16 size and can be changed properly to be applied to other sizes.

The left in the formula (1) represents a value obtained by summing up differences between each even line(top field) pixel value and its neighboring odd line(bottom field) pixel value, the pixels being at the same horizontal location. Referring to FIG. 6, differences of $P_{(0,0)}$ and $P_{(1,0)}$, $P_{(1,0)}$ and $P_{(2,0)}$, . . . , $P_{(0,1)}$ and $P_{(1,1)}$, $P_{(1,1)}$ and $P_{(2,1)}$, . . . , and $P_{(14,15)}$ and $P_{(15,15)}$ are calculated and all summed up. The right in the formula (1) represents a value obtained by summing up differences between values of two pixels at the same horizontal location and respectively in two adjacent even lines and differences between values of two pixels at the same horizontal location and respectively in two adjacent odd lines. Referring to FIG. 6, differences of $P_{(0,0)}$ and $P_{(2,0)}$, $P_{(2,0)}$ and $P_{(4,0)}$, . . . , $P_{(1,0)}$ and $P_{(3,0)}$, $P_{(3,0)}$ and $P_{(5,0)}$, and $P_{(13, 15)}$ and $P_{(15,15)}$ are calculated and all summed up.

When there is much motion since there is temporal difference between each odd line and each even line, the value of the left in the formula (1) is relatively larger. On the other hand, since the value of the right in the formula (1) is based upon a difference between lines of the same field, that is, difference between an odd line and another odd line and difference between an even line and another even line, there is little temporal difference, so the value is not notably larger even though there is much motion.

Consequently, when there is much motion, the left value is larger than the right value. On the other hand, when there is little motion, the left value is less than the right value.

As a result, a coding mode signal for selecting a coding mode having a less error is sent to the switching unit 53. When a coding type mode signal SCM is a frame mode, the switching unit 53 switches the BAB from the BAB division unit 51 to the frame type coding unit 56. On the other hand, when a field mode signal is received, the switching unit 53 reads the BAB from the BAB division unit 51 and sends it to the field type coding unit 57.

An amount of motion in the BAB may be determined according to a reference expressed as:

$$\sum_{i=0}^{6}\sum_{j=0}^{15}(A+B)\sum_{i=0}^{6}\sum_{j=0}^{15}(C+D) \quad (2)$$

where if $(P_{(2i,j)} \neq P_{(2i+1,j)})$, A=1, otherwise, A=0 . . . (2-1),
if $(P_{(2i+1,j)} \neq P_{(2i+2,j)})$, B=1, otherwise, B=0 . . . (2-2),
if $(P_{(2i,j)} \neq P_{(2i+2,j)})$, C=1, otherwise, C=0 . . . (2-3), and
if $(P_{(2i+1,j)} \neq P_{(2i+3,j)})$, D=1, otherwise, D=0 . . . (2-4).
The formulas (1) and (2) have the same result. This is because each pixel in the BAB has one of only two values such as 0 and 1.

FIG. 7 is a block diagram of a coding type mode determining unit according to one embodiment of the present invention.

A BAB memory unit 71 stores an input BAB from the BAB division unit 51. An address generating unit 72 generates an address to make the BAB memory output the BAB in units of a frame to a first shape comparing unit 73a and a second shape comparing unit 73b or the BAB in units of a field to a third shape comparing unit 73c and a fourth shape comparing unit 73d. The first shape comparing unit 73a compares a pair of pixels at the same horizontal location in each odd line and each consecutive even line in the frame BAB. The second shape comparing unit 73b compares a pair of pixels at the same horizontal location in each even and consecutive odd line in the frame BAB. The third shape comparing unit 73c compares pixels at the same horizontal location in a pair of consecutive odd lines in the BAB. The fourth shape comparing unit 73d compares pixels at the same horizontal location in a pair of consecutive even lines in the BAB.

First to fourth counting units 74a to 74d respectively count outputs of the first to fourth shape comparing units 73a to 73d. A first summing unit 75a sums up the outputs of the first and second counting units 74a and 74b. A second summing unit 75b sums up the outputs of the third and fourth counting units 74c and 74d. A frame/field mode selecting and coding unit 76 compares outputs of the first and second summing units 75a and 75b to decide a field or frame mode and produces the SCM signal. And the frame/field mode selecting and coding unit 76 also encode the SCM signal and outputs its bitstream to multiplexer 61.

A coding type mode signal SCM controls the switching unit 53 depicted in FIG. 5 and a bitstream is inputted to the multiplexer 61 depicted in FIG. 5.

The first shape comparing unit 73a compares a pixel $P_{(2,j)}$ in the even lines (top field) with a pixel $P_{(2i+1,j)}$ at the same horizontal position in the consecutive odd lines (bottom field) in the input BAB stored in the BAB memory 71, wherein "j" is one of the positive numbers from 0 to 15, and "i" is one of the positive numbers from 0 to 6. Specifically, it compares $P_{(0,0)}$ with $P_{(1,0)}$, $P_{(2,0)}$ with $P_{(3,0)}$, ..., $P_{(14,0)}$ with $P_{(15,0)}$, ..., and $P_{(12,15)}$ with $P_{(13,15)}$. As a result of the comparison, two pixels are not equal, 1 is produced, and two pixels are equal, 0 is produced. The second shape comparing unit 73b compares a pixel $P_{(2i+1,j)}$ in each odd line with a pixel $P_{(2i+2,j)}$ at the same horizontal position in each consecutive even line, wherein "j" is one of the positive numbers from 0 to 15, and "i" is one of the positive numbers from 0 to 6. Specifically, it compares $P_{(1,0)}$ with $P_{(2,0)}$, $P_{(3,0)}$ with $P_{(4,0)}$, ..., $P_{(13,0)}$ with $P_{(14,0)}$ ..., and $P_{(13,15)}$ with $P_{(14,15)}$. As a result of the comparison, when two pixels are not equal, 1 is produced, and when two pixels are equal, 0 is produced. The third shape comparing unit 73c compares a pixel $P_{(2i,j)}$ in each even line with a pixel $P_{(2i+2,j)}$ at the same horizontal position in each consecutive even line, wherein "j" is one of the positive numbers from 0 to 15, and "i" is one of the positive numbers from 0 to 6. Specifically, it compares $P_{(0,0)}$ with $P_{(2,0)}$, $P_{(2,0)}$ with $P_{(4,0)}$, ..., $P_{(12,0)}$ with $P_{(14,0)}$, ..., and $P_{(12,15)}$ with $P_{(14,15)}$. As a result of the comparison, two pixels are not equal 1 is produced, and two pixels are equal 0 is produced. The fourth shape comparing unit 73d compares a pixel $P_{(2i+1,j)}$ in each odd line with a pixel $P_{(2i+3,j)}$ at the same horizontal position in each consecutive odd line, wherein "j" is one of the positive numbers from 0 to 15, and "i" is one of the positive numbers from 0 to 6. Specifically, it compares $P_{(1,0)}$ with $P_{(3,0)}$, $P_{(3,0)}$ with $P_{(5,0)}$, ..., $P_{(13,0)}$ with $P_{(15,0)}$, ..., and $P_{(13,15)}$ with $P_{(15,15)}$. As a result of the comparison, two pixels are not equal, "1" is produced, and two pixels are equal, "0" is produced. The ranges of "i" and "1" can be changed in accordance with the size of the BAB. In this embodiment described above, the size of the BAB is 16 pixels×16 lines.

The four counting units 74a to 74d perform the same operation. Each counting unit is reset whenever a new BAB is inputted thereto and increases by one when "1" is inputted. After such operation is performed with respect to whole ranges of "i" and "j", results of each counting unit are inputted to the their corresponding summing units 75a and 75b.

Values of the first and second counting units 74a and 74b are summed up at the first summing unit 75a, and values of the third and fourth counting units 74c and 74d are summed up at the second summing unit 75b. It is be noted that a result of the summing at the first summing unit 75a corresponds to a sum of differences between pixels in a pair of consecutive lines in the input BAB while a result of the summing at the second summing unit 75b corresponds to a sum of differences between pixels in a pair of consecutive lines within the same field.

In other words, if correlation between pixels of shape information in a pair of consecutive lines is high, the result of the first summing unit 75a is small, and if correlation between pixels of shape information in a pair of consecutive lines in the same field is high, the result of the second summing unit 75b is small When the result of the first summing unit 75a is large, this means that variation of the shape information between the two fields is large. In this regard, the frame/field mode selecting unit 76 decides a coding mode in favor of high correlation and generates a corresponding coding type mode signal SCM. Namely, when the result value of the first summing unit 75a is small the SCM is set to a frame mode, and when the result value of the second summing unit 75b is small, the SCM is set to a field mode.

The SCM is the information necessary for decoding the shape information at a decoding unit, so it should be encoded and transmitted to a receiver. The decoder decodes the data representing the coding type mode at a shape information decoder and determines whether the data indicates the frame type mode where a block of the shape information is coded in units of a frame type or the field type mode where a block of the shape information is coded in units of a field type. In the embodiment of the present invention, a bit 0 is produced as the SCM for the frame type mode while a bit 1 is produced as the SCM for the field type mode, but the coding method for the SCM is not limited to the present invention.

Figure 8:
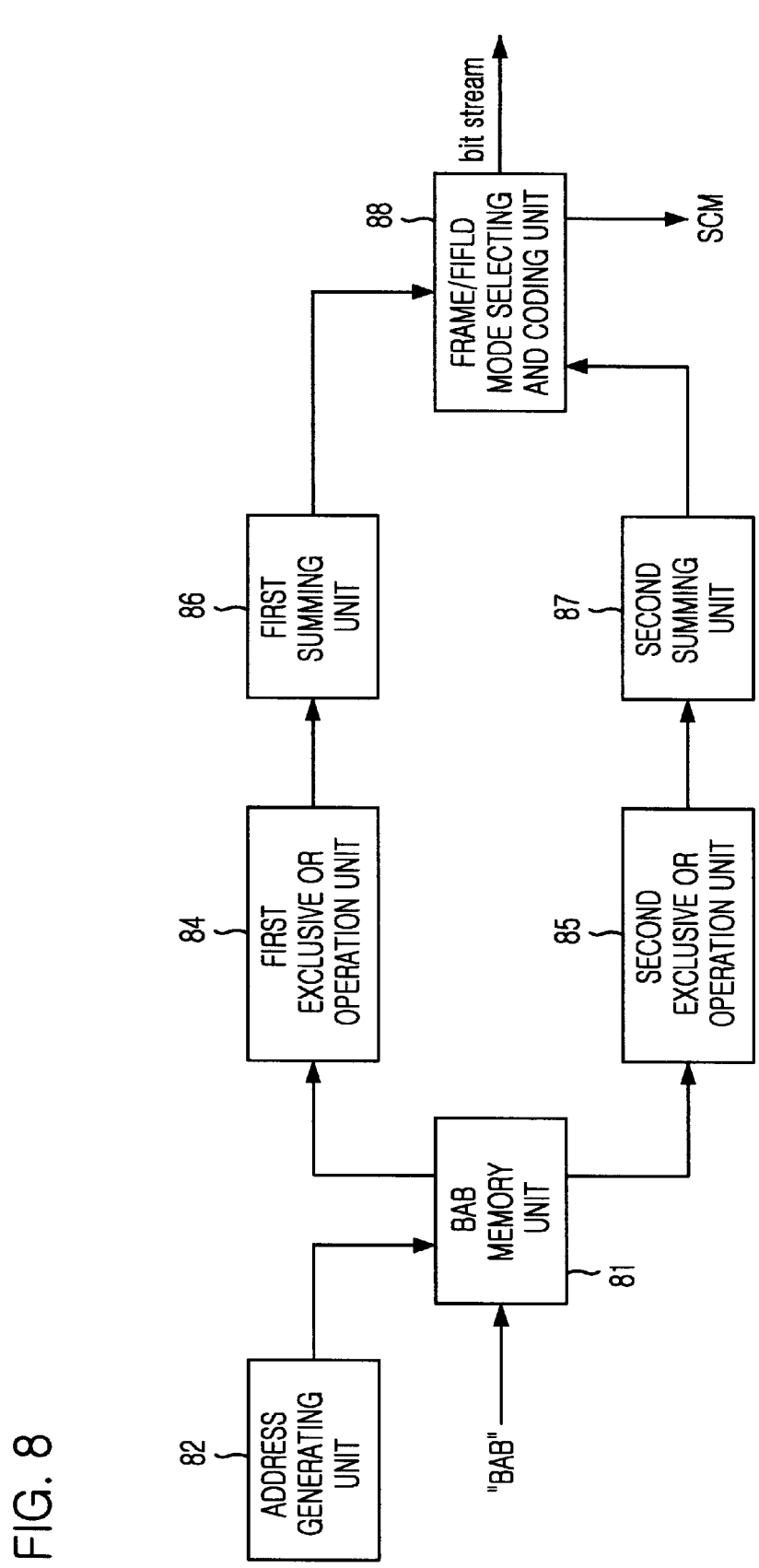
FIG. 8 is a block diagram of a coding mode determining unit according to another embodiment of the present invention.

FIG. 8 is a block diagram of a shape coding type mode determining unit according to another embodiment of the present invention. A BAB memory unit 81 stores an input BAB from the BAB division unit 51. An address generating unit 82 generates an address to make the BAB memory unit 81 output the BAB in units of a frame type to a first exclusive OR(EOR) operation unit 84 or the BAB in units of a field type to a second EOR operation unit 85. The first EOR operation unit 84 performs an EOR operation with respect to pairs of pixels at the same horizontal location in consecutive line pairs within the frame BAB (65) stored in the BAB memory unit 81. The second EOR operation unit 85 reads odd line field (66) and even line field (67) from the frame BAB (65) stored in the BAB memory unit 81 and performs an EOR operation with respect to pairs of pixels at the same horizontal location in consecutive line pairs within each field. First and second summing units 86 and 87 respectively sum up outputs of the first and second EOR operation units 84 and 85. The summing units can be replaced with counting units because the first and second EOR operation units 84 and 85 output data "0" or "1", so that the counting unit can increase a count value by one when the data "1" is inputted thereto. A frame/field mode selecting and coding unit 88 compares the outputs of the first and second summing units 86 and 87 to decide a field or frame type mode and generates a coding type mode signal corresponding to a result of the decision.

The formula (2) can be simply expressed as the formula (3):

$$\sum_{i=0}^{6}\sum_{j=0}^{15}(A+B) \rangle \sum_{i=0}^{6}\sum_{j=0}^{15}(C+D) \quad (3)$$

where, $A=P_{(2i,j)} \otimes P_{(2i+1,j)}$ ... (3-1)
$B=P_{(2i+1,j)} \otimes P_{(2i+2,j)}$ ... (3-2)
$C=P_{(2i,j)} \otimes P_{(2i+2,j)}$ ... (3-3)
$D=P_{(2i+1,j)} \otimes P_{(2i+3,j)}$ ... (3-4)

A character "$\otimes$" shown in the formulas (3-1), (3-2), (3-3), and (3-4) is an operator in an EOR operation and has the following features:

if(a==b), a$\otimes$b=0, otherwise, a$\otimes$b=10.

In other words, if a is equal to b, 0 is produced, otherwise, 1 is produced. Therefore, the formulas (3) and (2) equally operate with respect to the shape information. A configuration of a coding type mode determining unit implemented based upon the formula (3) is illustrated in FIG. 8.

Figure 9A:
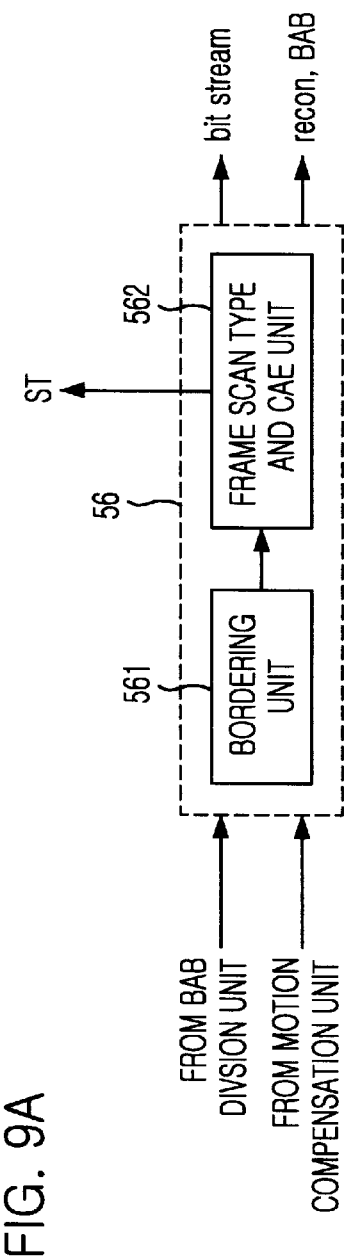
FIGS. 9a and 9b are block diagrams of a frame type coding unit and a field type coding unit according to the present invention.
Figure 9B:
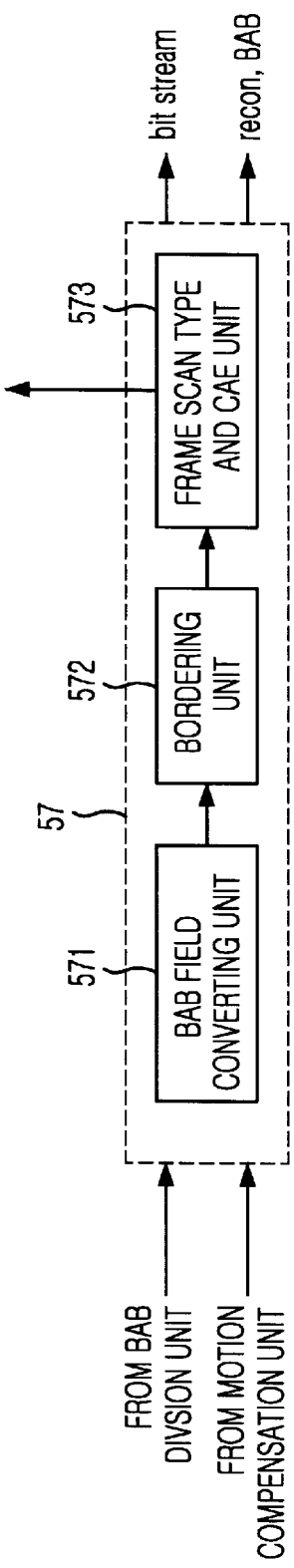

FIGS. 9a and 9b are block diagrams of a frame type coding unit and a field type coding unit according to the present invention. In this embodiment, a context-based arithmetic encoding (CAE) method is employed, but other encoding methods can be used.

A frame type coding unit 56 comprises a bordering unit 561 and a frame scan type and CAE unit 562 The bordering unit 561 performs the bordering—described in detail below—of the frame BAB received from the BAB division unit 51 via the switching unit 53. The frame scan type and CAE unit 562 decides a scan type, that is, determines whether to perform the CAE in horizontal or vertical direction with respect to the bordered BAB and performs the CAE.

Figures 10A, 10B:
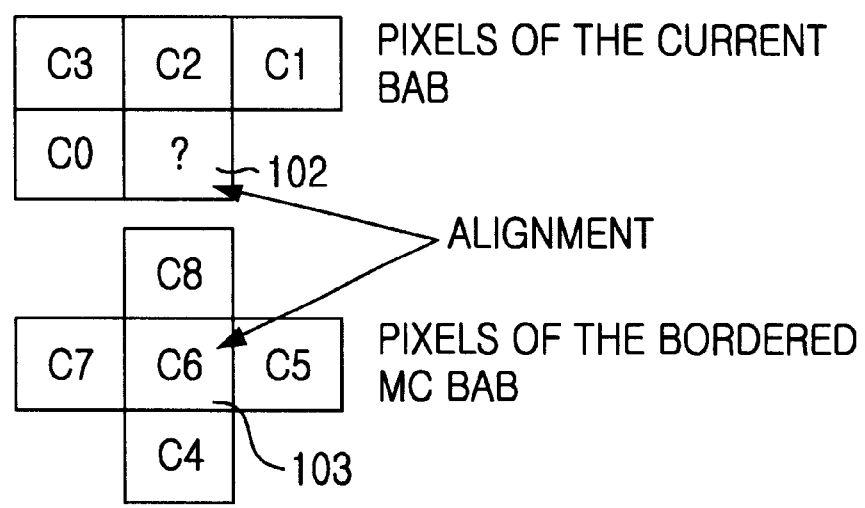
FIGS. 10a and 10b show an INTRA template and an INTER template which are used in context based arithmetic encoding (CAE)

Through the CAE, each value of pixels, 0 or 1, is arithmetic-encoded before transmission. As shown in FIGS. 10a and 10b, a context template is made using neighboring pixels for construction of and reference to a probability table. For example, if the neighboring pixels in the context are all "0", namely, background pixels, there is high probability in that a current pixel to be coded is also "0", and if the neighboring pixels in the context are all "1", namely, object pixels, there is high probability in that the current pixel to be coded is "1" rather than "0". Alternatively, if the neighboring pixels in the context are all "0", namely, background pixels, there is very low probability that the current pixel to be coded is also "1". As illustrated, when the current pixel value is arithmetic-encoded, it is adaptively encoded by changing the probability in accordance with values of the neighboring pixels.

The frame scan type and CAE unit 562 performs the CAE while scanning the frame BAB according to the scan type described below. The BAB outputted from the BAB division unit 51 is inputted to the bordering unit 561 via the switching unit 53. The switching unit 53, as described in advance, switches the BAB to the frame type coding unit 56 or the field type coding unit 57 according to the coding type mode signal received from the coding type mode determining unit 52. The bordering operation is necessary for construction of the context shown in FIGS. 10a and 10b when a pixel 101, 102, 103 to be coded is located at the border of the BAB. Specifically, when the pixel 101 in FIG. 10a is at a left border of BAB, pixels C0, C1, C5, C6 and C9 are not present, so these pixels should be brought from an adjacent BAB for using CAE. We call this operation BAB bordering. The BAB bordered at the bordering unit 561 is inputted to the frame scan type and CAE unit 562. The frame scan type and CAE unit 562 performs CAE in both directions—horizontal and vertical directions, and decides the direction which shows better coding efficiency by comparing the amounts of coded bits. We call this direction for CAE a scan type. The decided scan type is coded at the overhead coding unit 58 and transmitted to the decoder. Coded data is inputted into the multiplexer 61 in the form of a bitstream and multiplexed at the multiplexer 61 before being transmitted to the decoder. Reconstructed BAB is also inputted to the shape reconstructing unit 60.

As shown in FIG. 9b, a field type coding unit 57 comprises a BAB field converting unit 571, a bordering unit 572, and a field scan type and CAE unit 573. The BAB field converting unit 571 converts the frame BAB received from the BAB division unit 51 via the switching unit 53 into field BAB 66 and 67 shown in FIG. 6b. The bordering unit 572 performs the bordering of the field BAB received from the BAB field converting unit 571. The field scan type and CAE unit 573 determines whether to scan the bordered field BAB from the bordering unit 572 in transverse direction or longitudinal direction and performs the CAE. Scan type(s) decided at the field scan type and CAE unit 573 is(are) coded at the overhead coding unit 58 and transmitted to the decoder, and coded data is inputted into the multiplexer 61 and multiplexed at the multiplexer 61 before being transmitted to the decoder. Reconstructed field BAB is inputted to the shape reconstructing unit 60.

Figure 11:
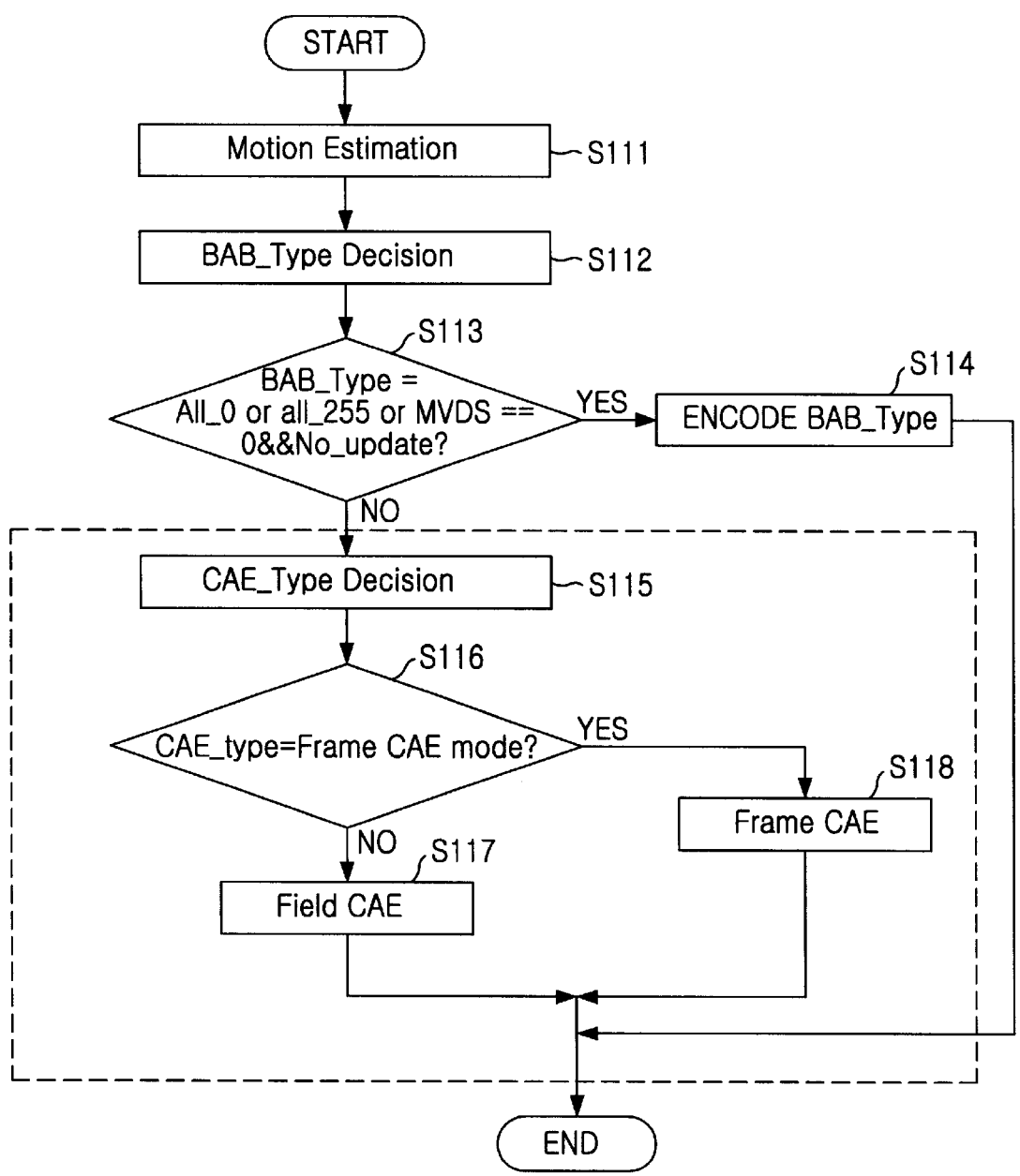
FIG. 11 is a flow chart how interlaced shape information is adaptively coded according to the present invention.

FIG. 11 is a flow chart illustrating how interlaced shape information is adaptively coded according to the present invention. When coding the shape information, shape information of a whole picture is divided into binary alpha blocks (BABs). Therefore, an input in the flow chart shown in FIG. 11 is the BAB and an operation of FIG. 11 is performed as many times as the number of BABs in a whole picture.

Motion estimation is performed by using shape information of a reference picture with respect to the BAB (S111). One motion information per BAB can be estimated or two motion information can be estimated in units of a field type with respect to the BAB. When one motion information estimation and two motion information estimation are used together, a flag for indicating which motion information estimation is used should be transmitted to a receiving part.

Subsequently, an overhead of the shape information, BAB_type, is decided (S112). The BAB type can be classified into seven types, such as All_0, All_255, MVDs=0&&No_update, MVDs!=0&&No_update, IntraCAE, MVDs=0&&InterCAE, MVDs!=0&&InterCAE.

If all pixel values in the BAB is "0" indicating a background, BAB_type=All_0. If all pixel values in the BAB is "255" indicating an object, BAB_type=All_255. "MVDs=0&&No_update" indicates that there is no motion information to be transmitted and prediction error information is not transmitted. "MVDs!=0&&No_update" indicates that there is motion information to be transmitted and the prediction error information is not transmitted. "Intra-CAE" indicates to perform CAE with respect to the BAB without use of reference shape information of a previous frame. "MVDs=0&&InterCAE" is the case that there is no motion information to be transmitted and the CAE should be performed using the reference shape information. "MVDs!=

0&&InterCAE" is the case that there is motion information to be transmitted and the CAE should be performed using the reference shape information.

It is determined that the BAB falls under a BAB_type, such as All_0, All_255, or MVDs=0&&No_update, which does not need further coding steps (S113). For the three cases which does not need the coding, BAB_type is encoded and the pertinent BAB coding procedure is terminated.

When the BAB falls under a BAB_type other than the above three types, it is determined which of field type shape coding and frame type shape coding is more efficient in terms of coding efficiency (S115). In other words, a shape coding type mode (SCM) is determined. In this invention, the SCM which is applied to a coder using the CAE is represented with CAE_type.

It is then determined whether a frame CAE mode is selected as CAE_type (S116). When the frame CAE mode is selected, the CAE is performed with respect to each frame BAB (S118). When a field CAE mode is selected, the CAE is performed in the units of field type (S117).

As illustrated, the coding is performed according to the selected mode and, in addition to the coded data, the flag of one bit, CAE_type, for expressing the field CAE mode or the frame CAE mode is transmitted to the decoder. Alternatively, without using the formula, the CAE is performed in units of a field type and a frame type and then CAE_type can be determined in favor of less number of bits generated.

Figure 12:
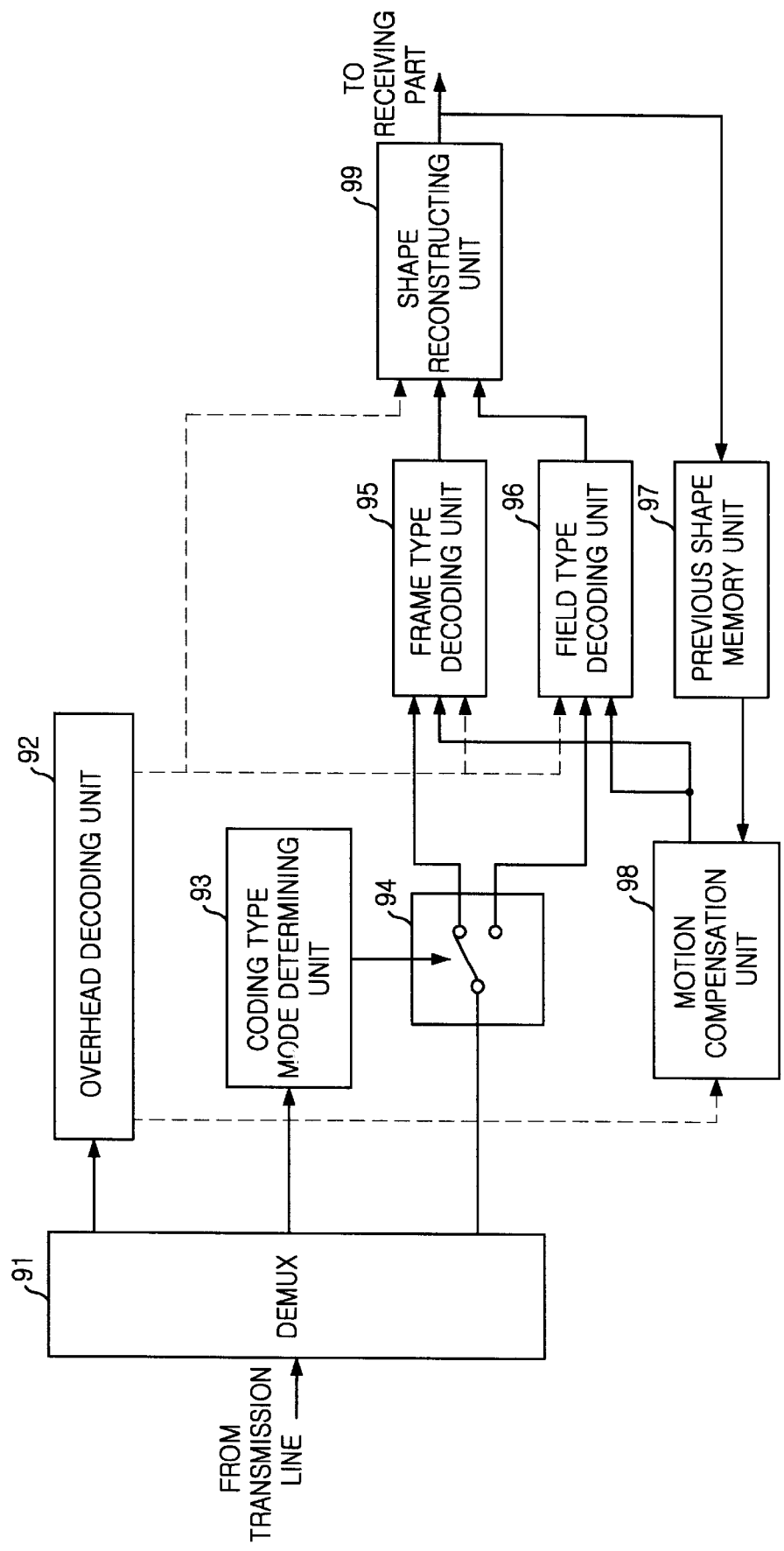
FIG. 12 is a block diagram of a shape information decoding apparatus according to the present invention.

FIG. 12 is a block diagram of shape information decoding apparatus according to the present invention.

A demultiplexer (DEMUX) 91 demultiplexes coding data received via a transmission line. An overhead decoding unit 92 decodes overhead information, such as BAB_type, conversion ratio (CR), and scan type (ST), in demultiplexed data received from the demultiplexer 91. A coding type mode decoding unit 93 decodes coding type mode data received from the demultiplexer 91. A switching unit 94 switches coded shape information received from the demultiplexer 91 according to the coding type mode received from the coding type mode decoding unit 93. A frame type decoding unit 95 decodes the shape information received via the switching unit 94 and motion-compensated, previous shape information in units of a frame type using the overhead information (BAB_type, CR, ST). A field type decoding unit 96 decodes the shape information received via the switching unit 94 and motion-compensated, previous shape information in units of a field type using the overhead information (BAB_type, CR, ST). A previous shape memory unit 97 stores previous shape information received from the shape reconstructing unit 99. A motion compensation unit 98 receives motion information from the overhead decoding unit 92 and the previous shape information from the previous shape memory unit 97 and performs motion compensation with respect to the previous shape information before transmission to the frame type decoding unit 95 and the field type decoding unit 96. A shape reconstructing unit 99 receives the overhead information from the overhead decoding unit 92 and the reconstructed BAB received from the frame type decoding unit 95 and the field type decoding unit 96, and produces reconstructed shape information of a whole picture.

The overhead decoding unit 92 decodes the overheads which are contained in a bitstream inputted to the demultiplexer 91 via the transmission line and necessary for the shape information decoding and controls the decoding process with decoded overhead information. If a coding apparatus uses the CAE, the overhead information includes BAB_type, CR, ST, and motion information. When BAB_type is All_0, the pixels of the reconstructed BAB are set to 0 at a decoder. On contrary, when BAB_type is All_255, the pixels of the reconstructed BAB are set to 1 at a decoder. A shape coding type mode (SCM) is decoded at the coding type mode decoding unit 93 and controls the switching unit 94. If the SCM is the frame mode, the bitstream outputted from the demultiplexer is inputted to and decoded at the frame type decoding unit 95. If the SCM is the field mode, the bitstream outputted from the demultiplexer is inputted to and decoded at the field type decoding unit 96. The motion compensation unit 98 produces a motion compensation BAB from the reference shape information stored in the previous shape memory unit 97 using decoded motion information from the overhead decoding unit 92. The motion compensated BAB is inputted to the frame type decoding unit 95 and the field type decoding unit 96. The frame type decoding unit 95 and the field type decoding unit 96 each decodes the bitstream received via the swithching unit 94 and produces reconstruction BAB, using the overhead from the overhead decoding unit 92 and the motion compensated BAB received from the motion compensation unit 98. The shape reconstructing unit 99 reconstructs the shape information of a whole picture using the reconstructing BAB and the overhead of the overhead decoding unit 92. The reconstructed shape information is stored in the previous shape memory unit 97 and used when the next shape information is decoded.

As illustrated above, the shape information decoding apparatus has the coding type mode decoding unit 93, which decodes data for expressing the SCM signal, and performs the decoding at the frame type decoding unit 95 or the field type decoding unit 96 according to the decoded SCM signal.

Figure 13:
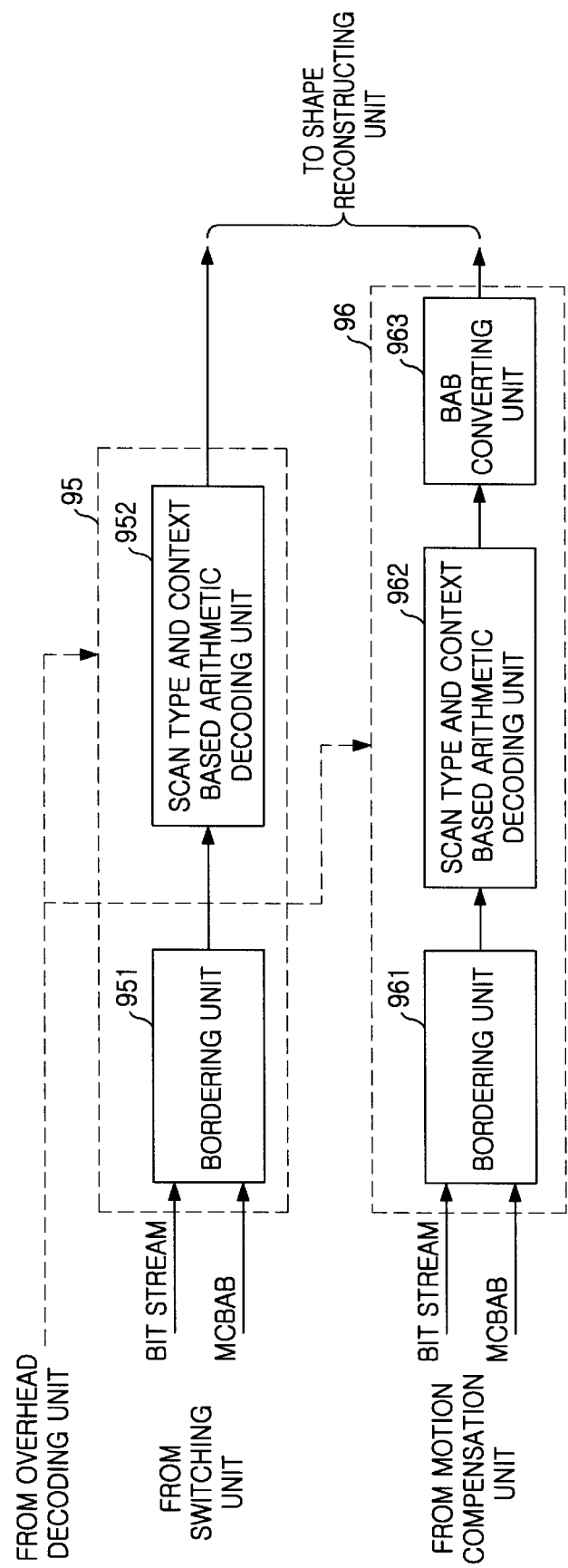
FIG. 13 is a detailed block diagram of a frame type decoding unit and a field type decoding unit according to the present invention.

FIG. 13 is a detailed block diagram of a frame type decoding unit and a field type decoding unit according to the present invention. Demultiplexed coded shape information outputted from the demultiplexer 91 is inputted to the frame type decoding unit 95 via the switching unit 94 when the coding type mode decoding unit 93 produces a frame mode SCM signal The frame type decoding unit 95 comprises a bordering unit 951 and a scan type and CAE decoding unit 952. The bordering unit 951, as previously described, borders pixels at the border of the BAB to construct a context when a pixel to be decoded is at the border of the BAB. The scan type and context-based arithmetic decoding unit 952 performs context-based arithmetic decoding while scanning the frame BAB using a scan type received from the overhead decoding unit 92.

The field type decoding unit 96 comprises a bordering unit 961, a scan type and context-based arithmetic decoding unit 962, and a BAB converting unit 963. The bordering unit 961 has the same function as the bordering unit 951 other than it performs bordering with respect to the BAB in units of a field type. The scan type and context-based arithmetic decoding unit 962 performs the context-based arithmetic decoding while scanning the field BAB using the scan type received from the overhead decoding unit 92 The BAB converting unit 963 converts the top field BAB and the bottom field BAB received from the scan type and context-based arithmetic decoding unit 962 into a frame BAB.

Input information of the frame type decoding unit 95 and the field type decoding unit 96 includes the coded bitstream, a motion compensation BAB, and the overhead information received from the overhead decoding unit 92. The frame type decoding unit 95 is first described in detail. The bordering unit 951 receives the motion compensated BAB and the bitstream and performs the bordering of adopting a neighboring pixel's value to construct the CAE template. The motion compensated BAB is transposed according to the scan type information among the input overheads (additional information). The context-based arithmetic decoding is performed on the bitstream received from the demultiplexer 91. By decoding the BAB_type information of the overhead, IntraCAE or InterCAE is obtained. The context-based arithmetic decoding is performed with one of these two methods. During the context-based arithmetic decoding& a context is obtained by using the neighboring pixels and arithmetic decoding is performed with reference to the probability in the obtained context.

The field type decoding unit 96 performs the same functions as the frame type decoding unit 97 other than that it performs the functions with respect to a field and that it reconstructs the frame BAB with the context-based arithmetic decoded field BAB at the BAB converting unit 963.

Figure 14:
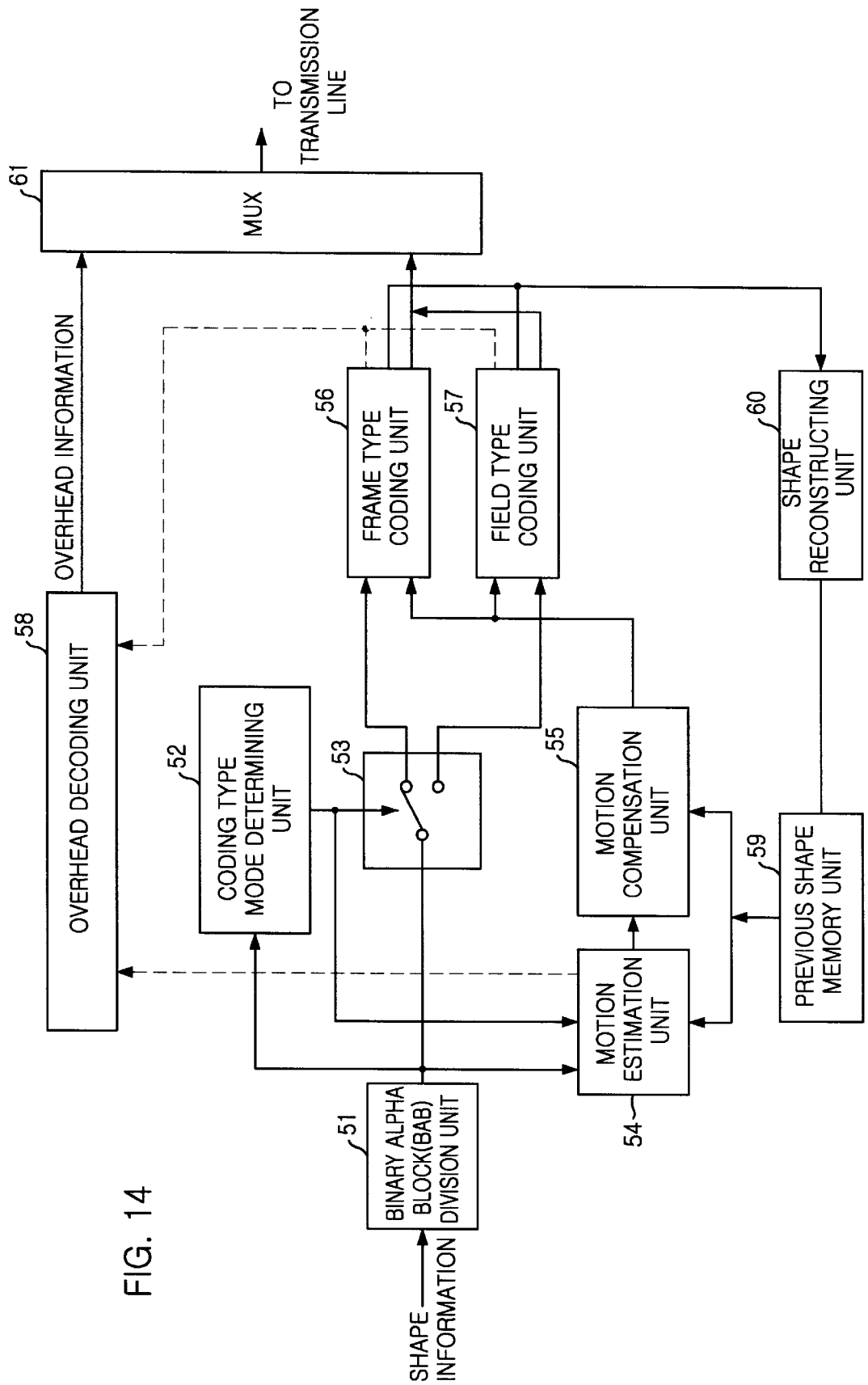
FIG. 14 is a block diagram of a coding apparatus for interlaced shape information according to another embodiment of the present invention.

FIG. 14 is a block diagram of a coding apparatus for interlaced shape information according to another embodiment of the present invention.

Compared with the coding apparatus shown in FIG. 5, a motion estimation unit 54' has different functions. Other components perform the same functions as those depicted in FIG. 5, so the same reference numbers are given and descriptions about them are omitted here.

The motion estimation unit 54' estimates motion using the previous shape information received from the previous shape memory unit 59 and the BAB received from the BAB division unit 51. The motion estimation unit 54' separately estimates the motion by each field in the BAB when the SCM signal from the coding type mode determining unit 52 is a field mode. Alternatively, when the SCM signal is a frame mode, the motion estimation unit 54' performs the motion estimation with respect to a frame of the BAB. A result of the motion estimation is sent to the motion compensation unit 56. The motion compensation unit 55 compensates the input BAB using the previous shape information received from the previous shape memory unit 59 according to the motion information received from the motion estimation unit 54'. The motion compensation unit 55 sends motion compensated BAB to both the frame type coding unit 56 and field type coding unit 57. When the frame mode is selected, the BAB is inputted to the frame type coding unit 56 and frame type coding is performed. When the field mode is selected, the BAB is inputted to the field type coding unit 57 and field type coding is performed.

As disclosed in the description of FIG. 5, motion estimation is not limited to a particular method, but the apparatus depicted in FIG. 14 estimates one piece of frame motion information per BAB when the SCM is the frame type mode and it estimates two pieces of field motion information per BAB when the SCM is the field type mode. The most important feature of the apparatus depicted in FIG. 14 is to control the motion information with the SCM.

This method has advantages when the motion information of the shape information is very closely related to the SCM. When the correlation between two fields is low, namely, there is much motion of an object between two fields, field-based motion information rather than frame-based motion information usually has an advantage. It would be most advantageous in efficient coding to select a better one of two kinds of motion information as shown in FIG. 5. Alternatively, when controlling the motion information with the SCM as shown in FIG. 14, complexity can be reduced and it is not necessary to transmit a flag for indicating that the motion information is a field type or a frame type.

When performing field-based motion estimation, restriction can be defined such that estimation and prediction with respect to an even (top) field should be performed against the even field of a reference picture and estimation and prediction for the odd (bottom) field should be performed against the odd field of a reference picture. In other words, the restriction means that the estimation and compensation of each field should use the same field of the reference shape information. In this case, transmission of the flag for indicating which field of the reference picture is used is not needed, thereby improving coding efficiency.

Figure 15:
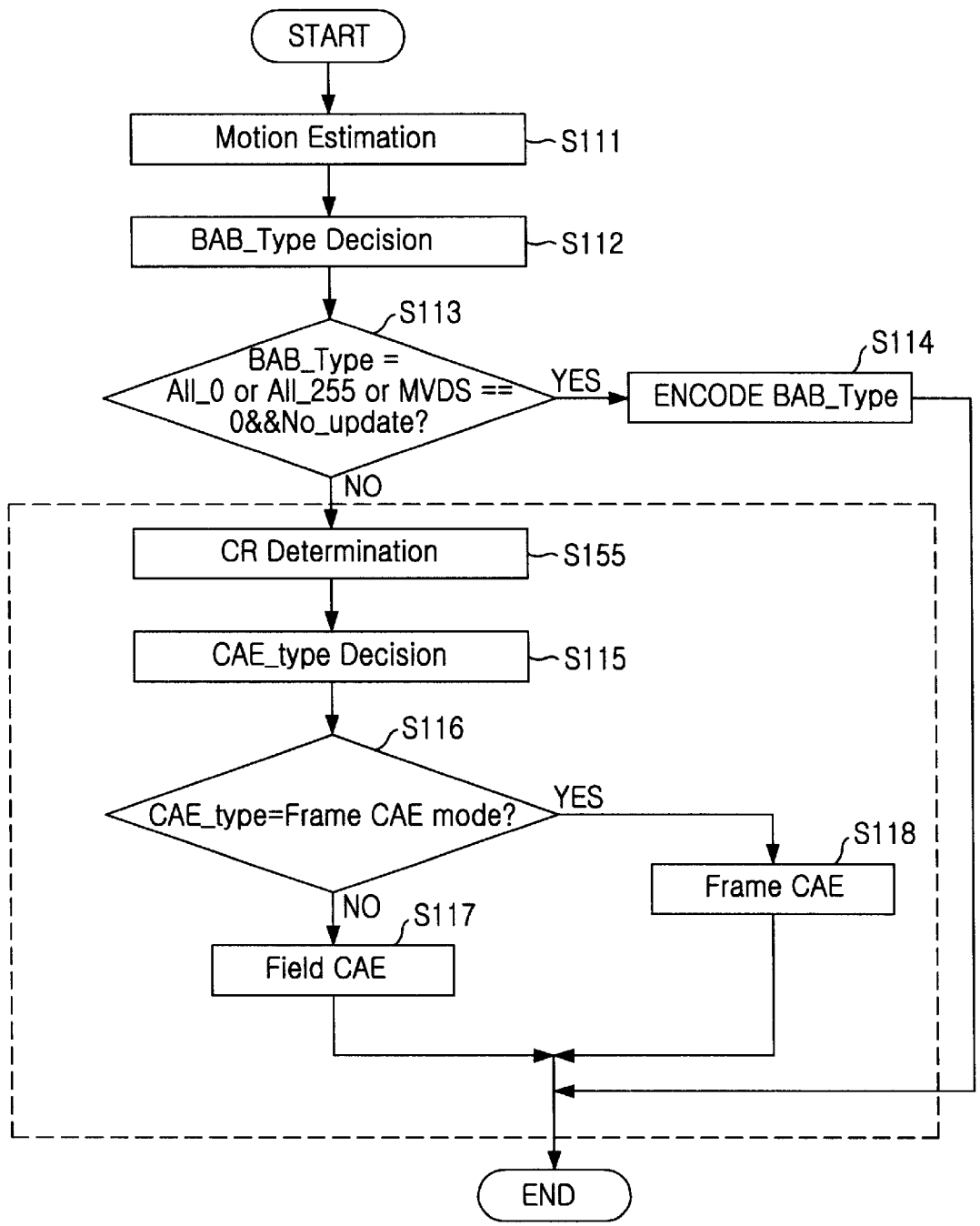
FIG. 15 is a flow chart of a coding method considering a conversion ratio (CR) according to one embodiment of the present invention.

FIG. 15 is a flow chart of a coding method considering a CR. Compared with FIG. 11, a new step, S115, is added. In this step, a CR is determined and coded for transmission. This step is performed when the BAB_type falls under a case other than All_0, All_255, and MVDs==0&& No_update. CR is information indicating degree of compression of the BAB. For example, if CR is ¼, the BAB is compressed to ¼ in both vertical and horizontal direction. Consequently, a size of the BAB is reduced to ⅙. When coding and transmitting the compressed BAB instead of an original size of BAB, the amount of bits generated is reduced although resulting in the lossy coding.

Figure 16:
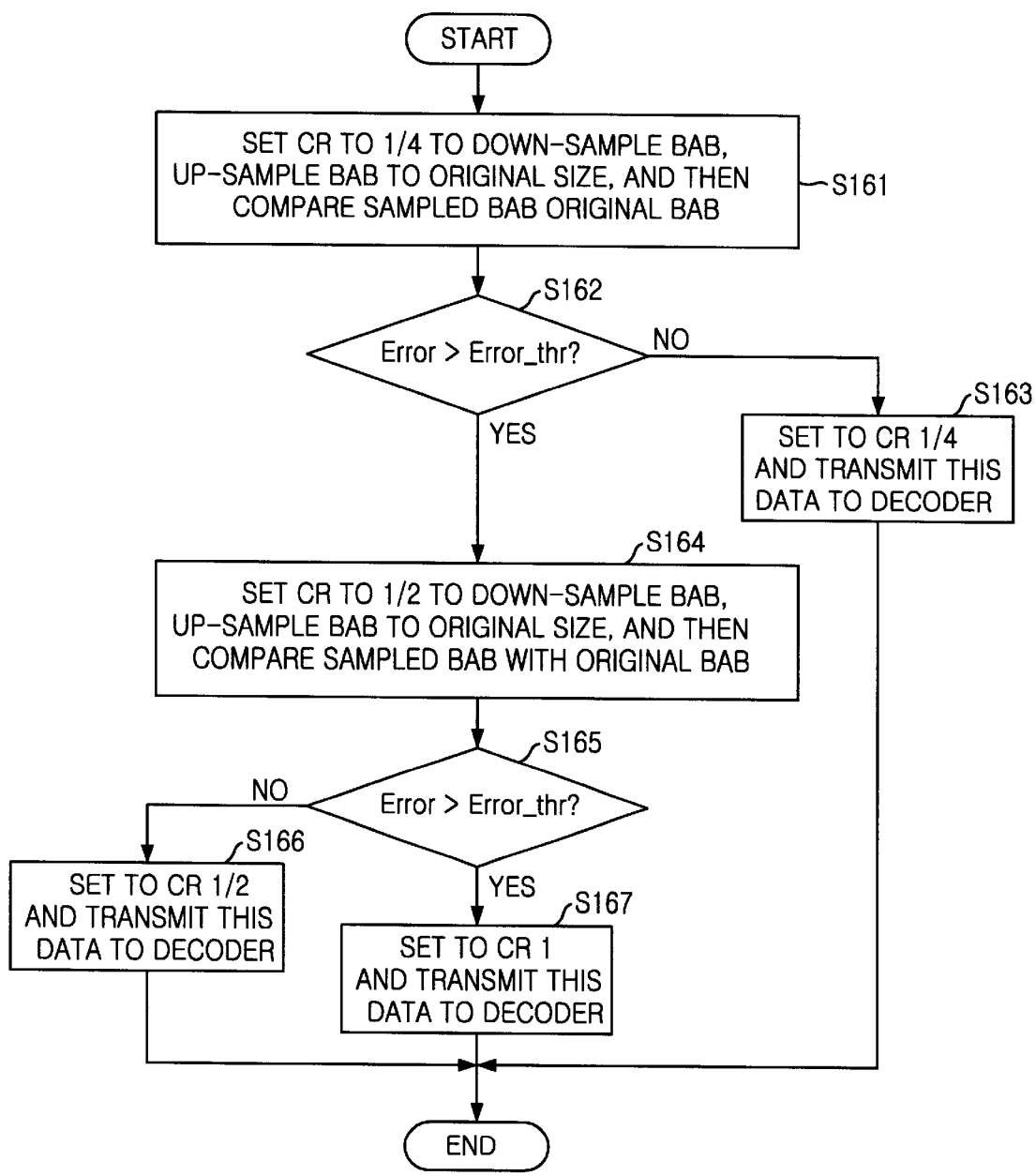
FIG. 16 is a flow chart showing how a CR is determined.

FIG. 16 is a flow chart showing how a CR is determined.

A BAB is down-sampled into ⅙ by setting a CR to ¼, in turn, the BAB of a size ⅙ is up-sampled to an original size and this up-sampled original size of BAB is compared with an input BAB to calculate the number of error pixels between the two BABs (S161). The calculated number of error pixels is compared with a predetermined threshold Error_thr (S162). When the number of error pixels is less than or equal to the threshold Error_thr, the CR is determined to be set to ¼ and this data is transmitted to a decoder (S163), before terminating the procedure. When the number of error pixels exceeds the threshold Error_thr, the CR is set to ½, thus down-sampling the BAB to a size ¼, and, in turn, the BAB of the size ¼ is up-sampled to an original size of BAB, so that the BAB is compared with an input BAB to calculate the number of error pixels between the two BABs (S164). The calculated number of error pixels(Error) is compared with the predetermined threshold Error_thr (S165). When the number of error pixels is less than or equal to the threshold Error_thr, the CR is determined to be set to ½ and this data is transmitted to the decoder (S166), before terminating the procedure. Otherwise, the CR is determined to be set to 1 and this data is transmitted to the decoder (S167). There are two methods in structuring an object BAB. As shown in FIG. 6a, while the BAB is maintaining a form of a frame, it is downsampled into 8×8 blocks or 4×4 blocks for the coding. Alternatively, as shown in FIG. 6b, two fields are separately downsampled and rearranged making a new type of BAB. Hereinafter, this BAB rearranged by each field is named a permuted BAB.

Figure 17:
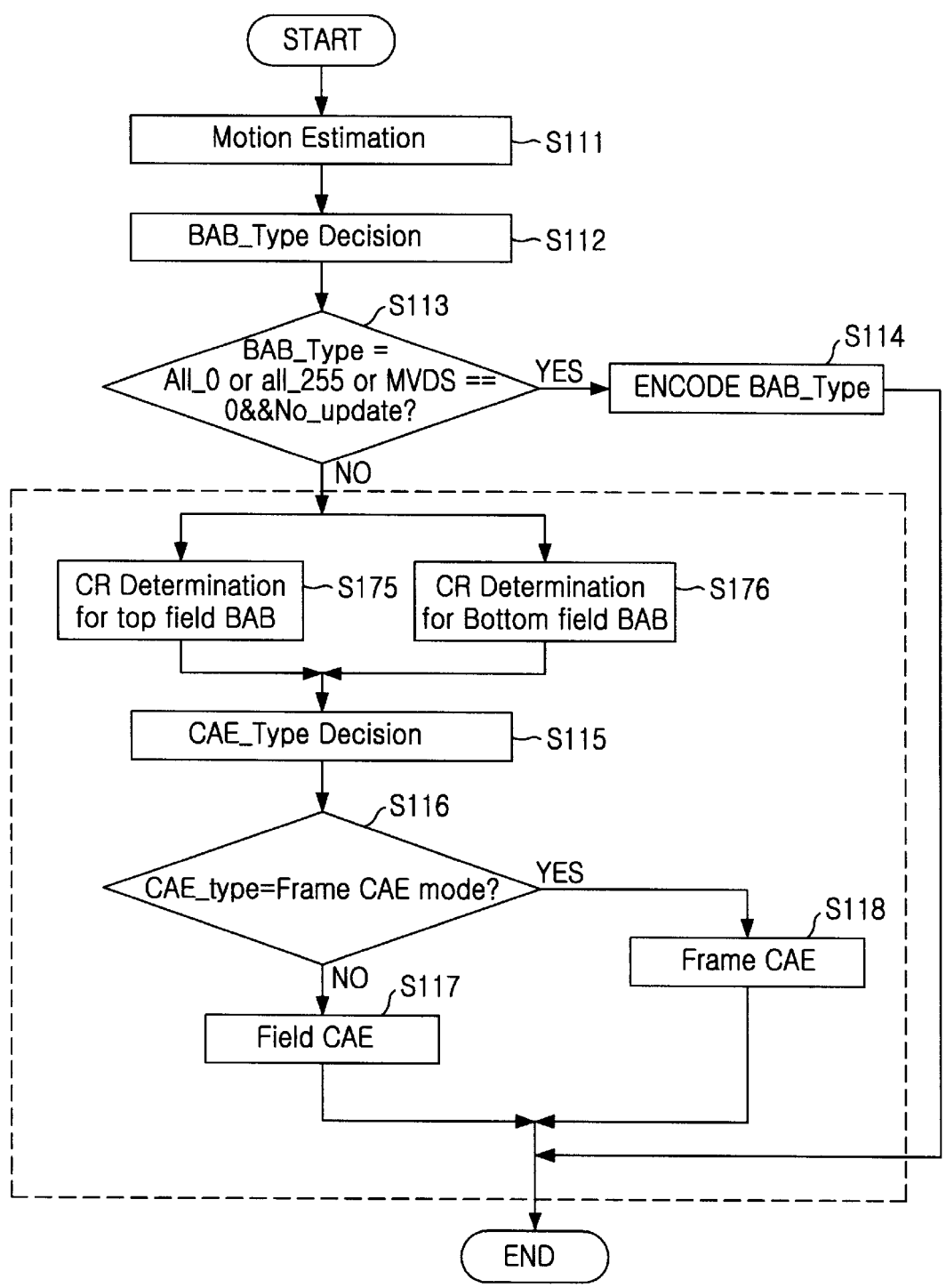
FIG. 17 is a flow chart showing how to determine each CR and perform coding with respect to a top and a bottom fields in a binary alpha block.

FIG. 17 is a flow chart showing how to determine each CR and perform coding with respect to a top and a bottom fields in a binary alpha block.

Compared with the method shown in FIG. 11, this method further includes the steps S175 and S176 of independently determining CRs with respect to a top and a bottom fields in a BAB.

The step S115 in FIG. 15 is divided into the two steps S175 and S176 in FIG. 17. According to the flow chart depicted in FIG. 15, the CR is determined with respect to a frame of the BAB and one CR per BAB is coded for transmission. On the other hand, the BAB is divided into two fields and CRs of each field are independently determined in FIG. 17. The step S175 is for the top field and the step S176 is for the bottom field. The procedure disclosed in FIG. 16 can be employed as a method of obtaining the CR. In this case, two CRs for each field in the BAB should be coded, so an overhead for transmitting the CRs can result in reduction of coding efficiency.

To prevent this problem the larger CR between two CRs of each field is selected and a selected single CR per BAB is coded and transmitted. For example, when the CR of the top field may be ½ and that of the bottom field may be ¼, the CR of the BAB is determined to be set to a larger value, ½, and then the CR value ½ for the BAB is coded and transmitted. This method is advantageous in that the CR can be determined by each field and an overhead does not occur.

The methods illustrated in FIGS. 15 and 17 are advantageous in facilitating the loss coding by applying the CR, but they have also a drawback that characteristics of the BAB do not considered in determining and coding the CR. In other words, while the method depicted in FIG. 15 is efficient with respect to the frame type BAB but inefficient with respect to the field type BAB, the method depicted in FIG. 17 is inefficient with respect to the frame type BAB but efficient with respect to the field type BAB. To overcome this problem, a method depicted in FIG. 18 is offered.

Figure 18:
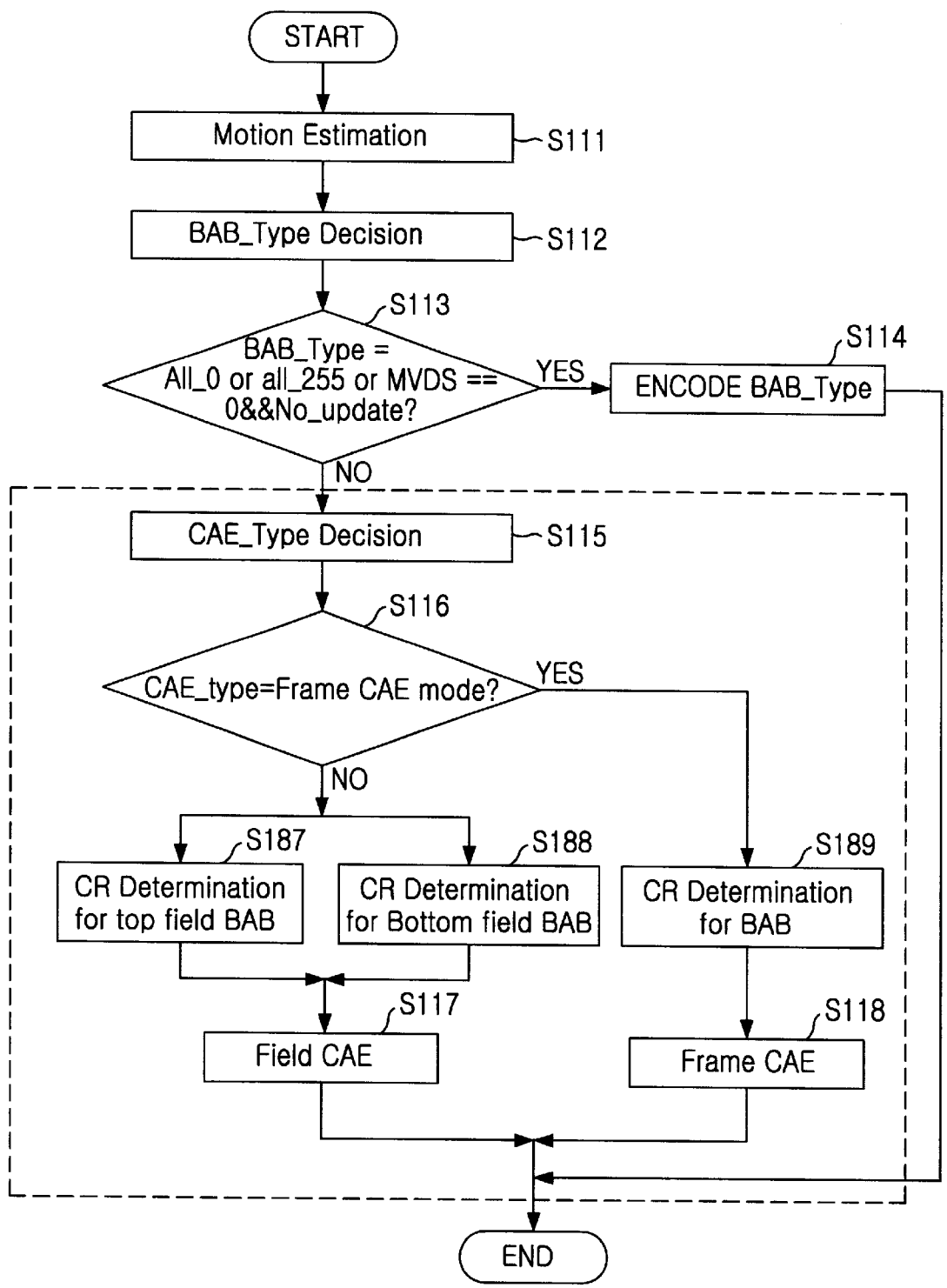
FIG. 18 is a flow chart showing a method of determining a CR after deciding CAE_type.

FIG. 18 is a flow chart showing a method of determining a CR after deciding CAE_type. After deciding CAE_type at the step S116, when CAE_type is the frame CAE mode, the CR of the BAB is determined and this data is transmitted to the decoder according to the method shown in FIG. 16 at the step S189. In this case, a single CR is determined. When CAE type is the field CAE mode, each CR is separately determined with respect to the top field BAB and the bottom field BAB and the CR data is transmitted to the decoder through the method shown in FIG. 16 at the respective steps S187 and S188.

Compared with the methods shown in FIGS. 15 and 17, the method illustrated in FIG. 18 first decides CAE_type and then determines the CR in accordance with CAE_type. In other words, when CAE_type is the frame CAE mode, a frame type CR is determined (S189). When CAE_type is the field CAE mode, a field type CR is determined (S187 and S188). Similarly to S175 and S176 in FIG. 17, a single CR per BAB can be selected and coded before transmission at S187 and S188 in FIG. 18.

Figure 19:
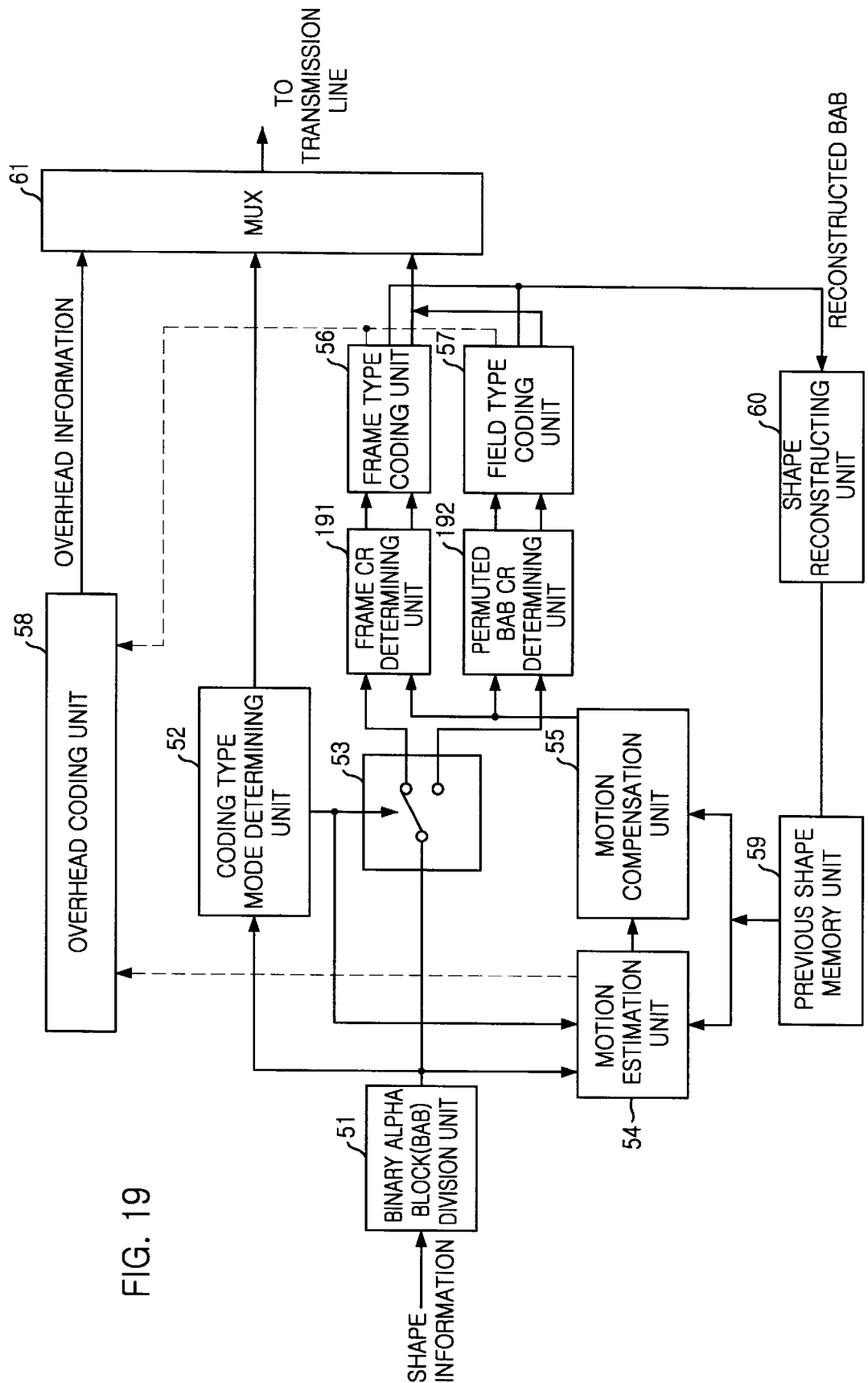
FIG. 19 is a block diagram of a coding apparatus having a field CR determining unit according to the present invention.

FIG. 19 is a block diagram of a coding apparatus having a field CR determining unit according to the present invention.

Compared with the apparatus depicted in FIG. 5, the apparatus depicted in FIG. 19 further includes a frame CR determining unit 191 and a field CR determining unit 192. The frame CR determining unit 191 corresponds to an apparatus for performing the step S189 in FIG. 18. The frame CR determining unit 191 determines a CR and converts the input BAB and the motion compensated BAB in accordance with the determined CR. A result BABs of the conversion are inputted to the frame type coding unit 56. The field CR determining unit 192 is for performing the steps S187 and S188 in FIG. 18. The field CR determining unit 192 determines CRs and converts the input BAB and the motion compensated BAB in accordance with the determined CRs. A result BABs of the conversion are inputted to the field type coding unit 57.

Compared with the apparatus illustrated in FIG. 5, FIGS. 15, 17, and 19 additionally using the CR have been described. As described above, use of the CR enables the loss coding and the coding efficiency can be improved by properly selecting the CR. Besides, there are further methods for additionally improving the coding efficiency.

Primarily, the CR can be used when deciding All_0 or All_255 at a BAB_type determining unit. This method can be applied to the lossy coding. While performing processes shown in the flow chart of FIG. 11, the input BAB which was down-sampled and then up-sampled is compared with a BAB in which all pixels have a value, 0. When the number of error pixels between the two BAB is less than or equal to a predetermined threshold, it is decided that BAB_type is All_0. Similarly, the input BAB which was down-sampled and then up-sampled is compared with a BAB in which all pixels have a value, 1 (or 255). When the number of error pixels between the two BAB is less than or equal to a predetermined threshold, it is decided that BAB_type is All_255. Through this method, the number of BABs where BAB_type is All_0 or All_255 increases, thereby reducing complexity and the amount of transmission data.

Another method is implemented by expanding and applying the first method described above to the field type coding. After performing the operations of the first method with respect to the frame type BAB as described before, the same operations are repeated with respect to the field type BAB. Specifically, the operations are applied to each independent field and, when both fields are detected to be All_0, BAB_type is determined to be All_0. When both fields are detected to be All_255, BAB_TYPE is determined to be All_255. This method is advantageous in processing interlaced shape information. Because, for the interlaced shape information, BAB_type can be All_0 in a field-based process although BAB_type is not All_0 in a frame-based process.

Further another method is to increase the number of No_Update BABs, such as MVDs==0&&No_Update and MVDs!=0&&No_Update, when deciding BAB_type. This method is also applied to the field type BAB. Specifically, No_Update is checked with respect to each field in a BAB. When MVDs==0&&No_Update is concluded with respect to both fields, it is decided that BAB_type is MVDs==0&&No_Update. Alternatively, when MVDs!==0&&No_Update is concluded with respect to both fields, it is decided that BAB_type is MVDs!==0&&No_Update. Since BAB_type can be No_Update in a field-based process although BAB_type is not No_Update in a frame-based process, this method is profitable in the coding.

Another method is to use the same scan type (ST) for both fields and to transmit a single ST per BAB. According to this method, overhead transmission can be reduced, thereby improving the coding efficiency.

Still another method is related to a flush bit. A coder using both arithmetic coding and non-arithmetic coding together should transmit a flush bit after finishing the arithmetic coding and before starting the non-arithmetic coding. When applying the field type coding to this coder in the same way as the frame type coding, flush bits should be transmitted twice in the field type coding, compared with in the frame type coding. This reduces the coding efficiency in the field type coding. To overcome this drawback, before the non-arithmetic coding with respect to the top and bottom fields, the arithmetic coding with respect to both fields are consecutively performed. This method allows a flush bit to be transmitted just once in the field type coding mode as in the frame type coding mode.

As illustrated, the present invention selects one of the frame and field type shape coding modes according to the amounts of motion of the frame based shape information and the field-based shape information to adaptively code the interlaced shape information, thereby improving efficiency in coding the interlaced shape information.

It will be apparent to those skilled in the art that various modifications and variations can be made in an apparatus and method of adaptively coding/decoding interlaced shape information of the present invention without deviating from the spirit or scope of the invention. Thus, it is intended that the present invention cover the modifications and variations of this invention provided they come within the scope of the appended claims and their equivalents.

What is claimed is:

1. An apparatus for adaptively coding shape information by using characteristics of the shape information in case of interlaced video, including a coding apparatus for the interlaced video comprising:

binary alpha block (BAB) division means for dividing the binary shape information into BABs of a predetermined size;

coding type mode determining means for determining whether to code said BAB received from said BAB division means from a frame or from a field;

switching means for switching said BAB received from said BAB division means according to a coding type mode signal produced by said coding type mode determining means;

motion estimation means for estimating a motion from said BAB received from said BAB division means and a previous shape information frame;

motion compensation means for compensating said current BAB for the motion using motion information received from said motion estimation means and the previous shape BAB;

frame type coding means for receiving said BAB via said switching means and a motion compensated BAB from said motion compensation means and coding the BAB using the motion compensated BAB in unit of frame type;

field type coding means for receiving said BAB via said switching means and the motion compensated BAB from said motion compensation means and coding the BAB using the motion compensated BAB in unit of field type;

shape reconstructing means for reconstructing the shape information from the BAB received from said frame type coding means and the field type coding means;

previous shape memory means for storing the reconstructed shape information received from said shape reconstructing means;

overhead coding means for creating overhead information from the motion information received from said motion estimation means and the data received from said frame type coding means and said field type coding means; and multiplexing means for multiplexing the coded data received from said frame type coding means and said field type coding means and said overhead information received from said overhead coding means before transmission.

2. An apparatus according to claim 1, further comprising conversion ratio determining means for determining a conversion ratio of said binary alpha block (BAB), converting the BAB received from said BAB division means and the motion compensated BAB received from said motion compensation means in accordance with the determined conversion ratio, and sending converted BABs to said frame type coding means and said field type coding means.

3. An apparatus according to claim 1, further comprising: conversion ratio determining means for determining a conversion ratio of said binary alpha block (BAB), converting the BAB received from said BAB division means and the motion compensated BAB received from said motion compensation means in accordance with the determined conversion ratio, and sending converted BABs to said frame type coding means and said field type coding means; and permuted BAB conversion ratio determining means for determining a conversion ratio of said binary alpha block (BAB), converting the BAB received from said BAB division means and the motion compensated BAB received from said motion compensation means in accordance with the determined conversion ratio, and sending converted BABs to said field type coding means.

4. An apparatus according to claim 1, wherein said coding type mode determining means comprises:

binary alpha block (BAB) memory means for storing the BAB received from said BAB division means;

address generating means for making said BAB memory means output the BAB in units of a frame type or a field type;

first shape comparing means for comparing each pair of pixels at the same horizontal location in each line pair comprising an odd and an adjacent even lines in the frame BAB received from said BAB memory means;

second shape comparing means for comparing each pair of pixels at the same horizontal location in each line pair comprising an even and an adjacent odd lines in the frame BAB from said BAB memory means;

third shape comparing means for comparing pixels at the same horizontal location in each pair of consecutive odd lines in the field BAB received from said BAB memory means;

fourth shape comparing means for comparing pixels at the same horizontal location in each pair of consecutive even lines in the field BAB received from said BAB memory means;

first to fourth counting means for respectively counting outputs of said first to fourth shape comparing means;

first summing means for summing up outputs of said first and second counting means;

second summing means for summing up outputs of said third and fourth counting means; and frame/field mode selecting means for comparing outputs of said first and second summing means to select either a field mode coding type or a frame mode coding type and producing a signal of the selected coding type.

5. An apparatus according to claim 1, wherein said coding type mode determining means comprises:

binary alpha block (BAB) memory means for storing the BAB received from said BAB division means;

address generating means for making said BAB memory means output the BAB in units of a frame type or a field type;

first exclusive OR operation means for performing an exclusive OR operation with respect to pairs of pixels at the same horizontal location in consecutive line pairs within a frame BAB received from said BAB memory means;

second exclusive OR operation means for receiving an odd field BAB and an even field BAB from said BAB memory means and performing an exclusive OR operation with respect to pairs of pixels at the same horizontal location in consecutive line pairs within each field BAB;

first and second summing means for respectively summing up outputs of said first and second exclusive OR operation means; and frame/field mode selecting means for comparing outputs of said first and second summing means to select one of a field and a frame mode coding types.

6. An apparatus according to claim 1, wherein said frame type coding means comprises bordering means and frame scan type and coding means and said field type coding means comprises bordering means and field scan type and coding means.

7. An apparatus for decoding shape information of an object in video, including a decoding apparatus for interlaced scanning comprising:
   demultiplexing means for demultiplexing input coded data;
   overhead decoding means for decoding overhead information contained in demultiplexed data received from said demultiplexing means;
   coding mode decoding means for decoding coding mode data received from said demultiplexing means;
   switching means for switching coded shape information received from said demultiplexing means according to the coding mode received from said coding mode decoding means;
   frame decoding means for decoding the shape information received via said switching means and motion compensated, previous shape information based upon a frame by using said overhead information;
   field decoding means for decoding the shape information received via said switching means and motion compensated, previous shape information based upon a field by using said overhead information;
   previous shape memory means for storing previous shape information received from said frame decoding means and said field decoding means;
   motion compensation means for receiving motion information from said overhead decoding means and the previous shape information from said previous shape memory means, performing motion compensation, and transmitting a result of the motion compensation to said frame decoding means and said field decoding means; and
   shape reconstructing means for receiving the overhead information from said overhead decoding means and reconstructing the shape information received from said frame decoding means and said field decoding means by using said overhead information.

8. An apparatus according to claim 7, wherein said frame decoding means comprises: bordering means for performing bordering with respect to a binary alpha block (BAB) received from said demultiplexing means; and scan type and decoding means for converting a scan type according to scan type information received from said overhead decoding means and scanning and decoding the frame BAB, and said field decoding means comprises: bordering means for performing bordering with respect to a BAB received from said demultiplexing means; scan type and decoding means for converting a scan type according to scan type information received from said overhead decoding means and scanning and decoding the BAB; and BAB converting means for converting an odd field BAB and an even field BAB received from said scan type and decoding means into a frame BAB.

9. An apparatus according to claim 7, wherein said decoding means is context based arithmetic decoding means.

10. An apparatus for coding interlaced shape information comprising:
    binary alpha block (BAB) division means for dividing the binary shape information into BABs of a predetermined size;
    coding mode determining means for determining whether to code said BAB received from said BAB division means based upon a frame or a field;
    switching means for switching said BAB received from said BAB division means according to a coding mode signal produced by said coding mode determining means;
    motion estimation means for estimating motion from said BAB received from said BAB division means and a previous BAB according to a coding mode received from said coding mode determining means;
    motion compensation means for compensating the current BAB for the motion by using motion information received from said motion estimation means and the previous BAB;
    frame type coding means for receiving said BAB via said switching means and a motion compensated BAB from said motion compensation means and coding the BAB using the motion compensated BAB in unit of frame type;
    field type coding means for receiving said BAB via said switching means and the motion compensated BAB from said motion compensation means and coding the BAB using the motion compensated BAB in unit of field type;
    shape reconstructing means for reconstructing the shape information from the BAB received from said frame type coding means and the field type coding means;
    previous shape memory means for storing the reconstructed shape information received from said shape reconstructing means;
    overhead coding means for creating overhead information from the motion information received from said motion estimation means and the data received from said frame coding means and said field coding means; and
    multiplexing means for multiplexing the coded data received from said frame coding means and said field coding means and said overhead information received from said overhead coding means before transmission.

11. A method for adaptively coding shape information by using characteristics of the shape information in case of interlaced video, including an adaptive interlaced shape information coding method comprising the steps of:
    performing motion compensation with respect to a binary alpha block by using previous frame information;
    determining a type of said binary alpha block based upon the result of motion estimation;
    when said binary alpha block is determined to be a type which does not need to be coded, coding and transmitting date indicating the type;
    when said binary alpha block is type which needs to be coded, determining whether to subject said binary alpha block to frame type coding or to field type coding according to said estimated amount of motion;

subjecting said binary alpha block to frame-based coding and transmitting the coded binary alpha block when the frame type coding is determined; and subjecting said binary alpha block to field-based coding and transmitting the coded binary alpha block when the field type coding is determined; and wherein a following formula is used to determine whether to subject said binary alpha block to the frame type coding or to the field type coding according to said estimated amount of motion, so said binary alpha block is determined to be subjected to the field type coding if a left value is larger than a right value in the formula and, alternatively, said binary alpha block is determined to be the subjected to the frame type coding if the left value is less than the right value in the formula:

$$\sum_{i=0}^{6}\sum_{j=0}^{15}(A+B)\sum_{i=0}^{6}\sum_{j=0}^{15}(C+D)$$

if($P_{(2i,j)} \neq P_{(2+1,j)}$), A=1, otherwise, A=0 if($P_{(2i+1,j)} \neq P_{(2i+2,j)}$), B=1, otherwise, B=0 if($P_{(2i,j)} \neq P_{(2i+2,j)}$), C=1, otherwise, C=0 if($P_{(2i+1,j)} \neq P_{(i2+3,j)}$), D=1, otherwise, D=0 where $P_{(i,j)}$ is binary shape information data.

\* \* \* \* \*